(12) United States Patent
Teeter et al.

(10) Patent No.: US 10,491,422 B2
(45) Date of Patent: Nov. 26, 2019

(54) NETWORKING DEVICE CONFIGURATION SYSTEM

(71) Applicant: Dell Products L.P., Round Rock, TX (US)

(72) Inventors: Victor B. Teeter, Round Rock, TX (US); Andrew Blake Berry, Austin, TX (US); Dean Williams Peters, Liberty Hall, TX (US)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 15/389,624

(22) Filed: Dec. 23, 2016

(65) Prior Publication Data

US 2018/0183663 A1   Jun. 28, 2018

(51) Int. Cl.
G06F 15/16    (2006.01)
H04L 12/46    (2006.01)
H04L 12/24    (2006.01)

(52) U.S. Cl.
CPC ...... *H04L 12/4641* (2013.01); *H04L 41/0816* (2013.01); *H04L 41/22* (2013.01)

(58) Field of Classification Search
CPC .................................................. H04L 41/0803
USPC ........................................................ 709/221
See application file for complete search history.

(56) References Cited

U.S. PATENT DOCUMENTS

| | | | | |
|---|---|---|---|---|
| 5,955,981 | A * | 9/1999 | Rangan | B60R 25/24 307/10.4 |
| 7,411,915 | B1 * | 8/2008 | Spain | H04L 41/0806 370/250 |
| 7,898,986 | B2 * | 3/2011 | Ford | H04L 41/0806 370/255 |
| 2008/0104278 | A1 * | 5/2008 | Ford | H04L 41/0806 709/250 |
| 2015/0215165 | A1 * | 7/2015 | Ohsuga | H04L 41/0859 709/221 |
| 2016/0191314 | A1 * | 6/2016 | Russell | H04L 41/22 709/221 |
| 2016/0247339 | A1 * | 8/2016 | Miller | B60R 25/24 |
| 2017/0063614 | A1 * | 3/2017 | Hartwig | H04L 41/0883 |

* cited by examiner

*Primary Examiner* — Hamza N Algibhah
(74) *Attorney, Agent, or Firm* — Haynes and Boone, LLP

(57) ABSTRACT

A networking device includes a chassis, a port located on the chassis, a port configuration display located on the chassis, and a plurality of port configuration buttons located on the chassis. A port configuration engine is included in the chassis and is coupled to each of the port, the port configuration display, and the plurality of port configuration buttons. The port configuration engine is configured to provide a current Virtual Local Area Network (VLAN) assignment for the port for display on the port configuration display. When the port configuration engine determines that a first port configuration button of the plurality of port configuration buttons has been actuated at least once, the port configuration engine modifies the current VLAN assignment for the port to provide a modified VLAN assignment for the port, and provides the modified VLAN assignment for the port for display on the port configuration display.

20 Claims, 19 Drawing Sheets

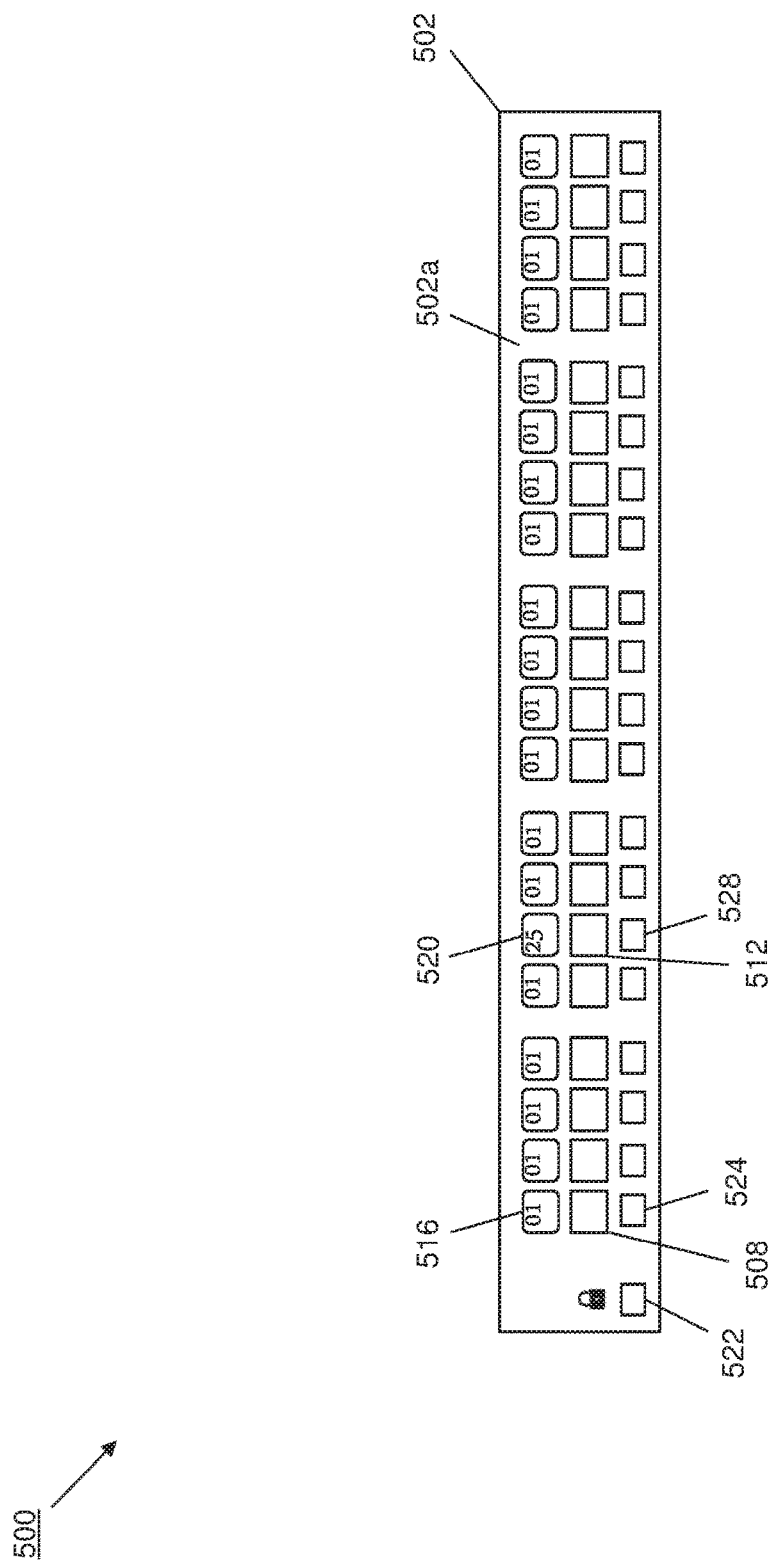

NETWORKING DEVICE CONFIGURATION SYSTEM

BACKGROUND

The present disclosure relates generally to information handling systems, and more particularly to a system for configuring a networking device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices, may require configuration in order to enable enhanced functionality that is provided by that networking device. For example, networking switches may be provided as "unmanaged" switches, or may include an unmanaged operational mode, that trades enhanced functionality for ease of setup (e.g., such unmanaged switches are essentially "plug-and-play" switches that allow devices to simply be connected to its ports to enable communication with each other over a single network without any need to configure the networking device or its ports). However, networking switches provided as "managed" switches, or including a managed operational mode, typically require some technical knowledge of networking switch configuration techniques in order to enable enhanced functionality. For example, configuring different Virtual Local Area Networks (VLANs) on a managed switch and assigning ports to each of those VLANs can require dozens of Command Line Interface (CLI) commands, or extensive time reading networking switch documentation to learn to use a web configuration client, and often result in service calls to networking device technical support. Furthermore, managed switches often require a management network and/or console port to create VLANs and assign ports to those VLANs, which further complicates the process of configuring the networking switch.

The need for technical knowledge such as that described above, and the complications that can result from a lack of that technical knowledge, raises a number of issues in the utilization of networking switches. For example, many companies must either employ an Information Technology (IT) professional with the required technical knowledge to configure their networking switches, or take on the task of configuring those networking switches themselves. However, the costs of employing an IT professional may be excessive, particularly when their most complicated responsibility may be to configure networking switches once or twice per year. This often results in the purchase of unneeded networking switches, and/or the misuse of networking switches. For example, it has been found that many companies simply purchase a separate unmanaged switch for each network they would like to utilize, rather than purchase a managed switch and configure that managed switch to provide each of the networks they would like to utilize. In some instances, it has been found that some companies purchase a separate (and more expensive) managed switch for each network they would like to utilize, while simply disregarding the enhanced functionality and multi-network ability enabled by those managed switches due to their inability or hesitancy to attempt to properly configure them.

Accordingly, it would be desirable to provide an improved networking device configuration system.

SUMMARY

According to one embodiment, an Information Handing System (IHS) includes a chassis; a port that is located on the chassis; a port configuration display that is located on the chassis; at least one port configuration button that is located on the chassis; and a port configuration engine that is included in the chassis and that is coupled to each of the port, the port configuration display, and the at least one port configuration button, wherein the port configuration engine is configured to: provide, for display on the port configuration display, a current configuration of the port; determine that the at least one port configuration button has been actuated at least once; modify, in response to determining that the at least one port configuration button has been actuated at least once, the current configuration of the port to provide a modified configuration of the port; and provide, for display on the port configuration display, the modified configuration of the port.

BRIEF DESCRIPTION OF THE DRAWINGS

FIG. 9b is a front view illustrating an embodiment of the networking device of FIG. 5 during configuration according to the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
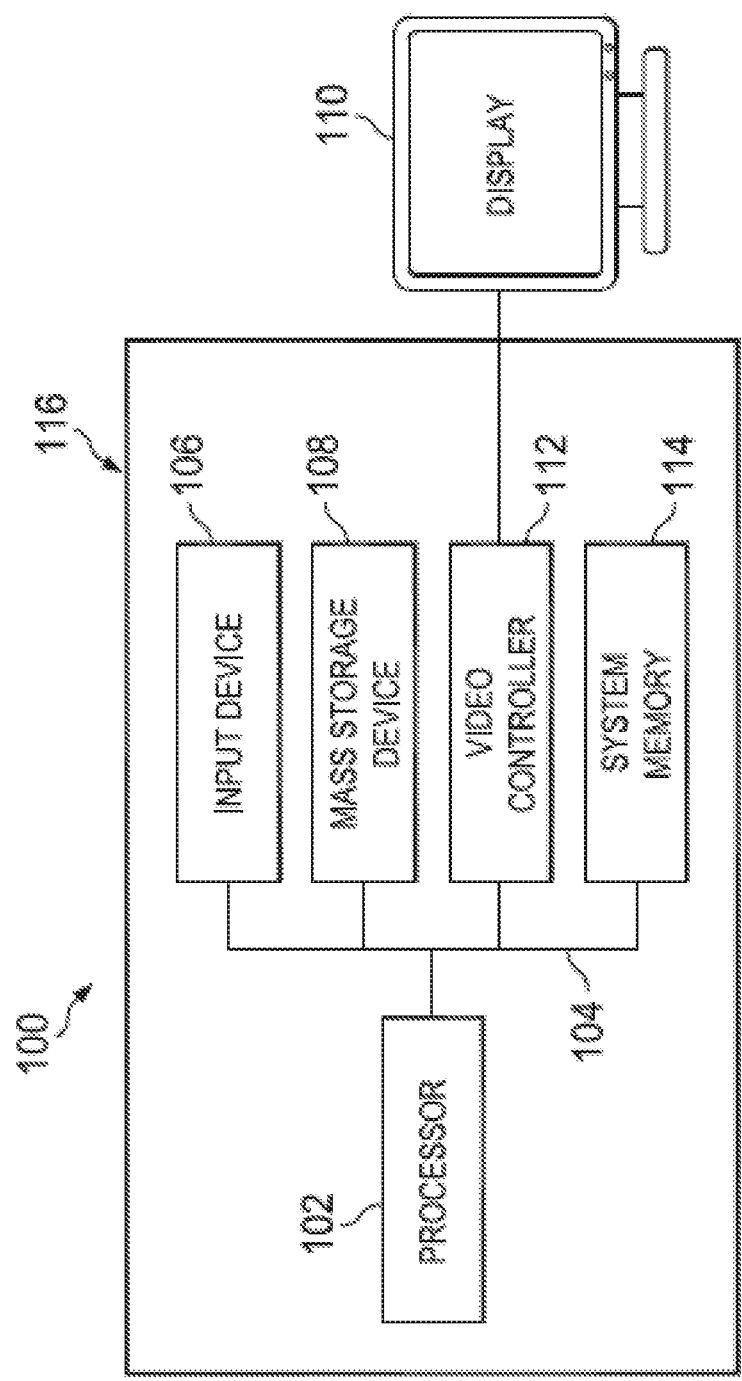
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
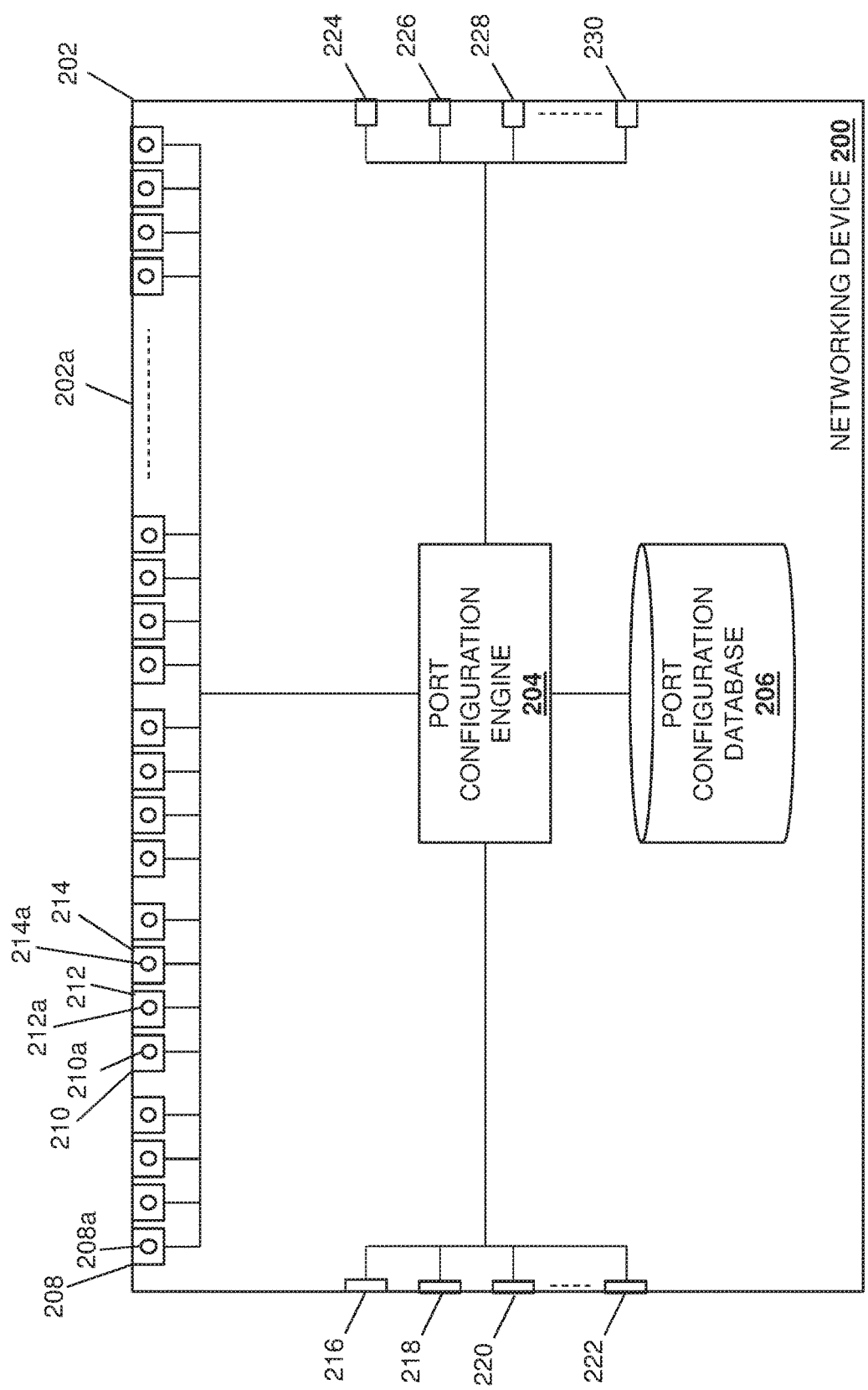
FIG. 2 is a schematic view illustrating an embodiment of a networking device.

Referring now to FIG. 2, an embodiment of a networking device 200 is illustrated. In an embodiment, the networking device 200 may be the IHS 100 discussed above with reference to FIG. 1, and/or may include some or all of the components of the IHS 100. In the illustrated embodiment, the networking device 200 includes a chassis 202 having a front surface 202a. The chassis 202 houses the components of the networking device 200, only some of which are illustrated in FIG. 2. For example, the chassis 200 may house a processing system (not illustrated, but which may include one or more of the processors 102 discussed above with reference to FIG. 1) and a memory system (not illustrated, but which may include the system memory 114 discussed above with reference to FIG. 1) that includes instructions that, when executed by the processing system, cause the processing system to provide a port configuration engine 204 that is configured to perform the functions of the port configuration engines and networking devices discussed below. The chassis 202 may also house a storage system (not illustrated, but which may include one or more of the mass storage devices 108 discussed above with reference to FIG. 1) that is coupled to the port configuration engine 204 (e.g., via a coupling between the storage system and the processing system) and that includes a port configuration database 206 that is discussed below as including a table in one embodiment, but which may include any of a variety of data storage structures that would enable the functionality discussed below. As discussed below, in some embodiments, the port configuration database 206 may include a port configuration table (or other data structure) having a plurality of predefined port configurations. For example, the port configuration table may include predefined Virtual Local Area Networks (VLANs), predefined trunking designations, predefined Link Aggregation Group (LAG) designations, and/or other predefined port configurations known in the art. However, as also discussed below, in other embodiments the port configuration database 206 may be configured to store port configurations that are dynamically created by the port configuration engine 204.

A plurality of ports are included in the chassis 202 and, in the illustrated embodiment, are located on the chassis 202 such that they are accessible on the front surface 202a of the chassis 200. However, the ports may be located within the chassis 202 or on different surfaces of the chassis 202 while remaining within the scope of the present disclosure. Each of the ports is coupled to the port configuration engine 204 (e.g., by couplings between the ports and the processing system.) For reference to the discussions in the examples below, particular ports are identified as port 208, port 210, port 212, and port 214, but it should be understood from FIG. 2 that many more ports are included on the chassis 202 and operable in the same manner as the ports 208-214 identified and discussed below. In the illustrated embodiment, each of the ports is associated with a respective port indicator. For reference to the discussions in the examples below, particular port identifiers are identified as port identifier 208a associated with port 208, port identifier 210a associated with port 210, port identifier 212a associated with port 212, and port identifier 214a associated with port 214. However, as also discussed and illustrated below, in some embodiments, the port identifiers may not be provided on the chassis 202. For example, the functionality of the port identifiers that is discussed in some of the embodiments described below may be omitted and/or provided by the port configuration display(s).

One or more port configuration displays are included in the chassis 202. Each port configuration display is coupled to the port configuration engine 204 (e.g., by couplings between the port configuration display(s) and the processing system.) In the illustrated embodiment, a plurality of port configuration displays 216, 218, 220, and up to 222 are located on a surface of the chassis 202. As discussed below, in some embodiments, only a single port configuration display may be included in the chassis 202. However, in other embodiments, a plurality of port configuration displays may be included on the chassis 202. For example, embodiments discussed below provide a corresponding port configuration display associated with each of the ports (e.g., the port configuration display 216 corresponding to the port 208, the port configuration display 218 corresponding to the port 210, the port configuration display 220 corresponding to the port 212, and the port configuration display 222 corresponding to the port 214). However, one of skill in the art in possession of the present disclosure will recognize that different numbers of port configuration displays other than those illustrated may provide the same functionality discussed below and thus will fall within the scope of the present disclosure. In the examples provided below, the port configuration display(s) are included in the chassis 202 such that they are accessible on the front surface 202a of the chassis 200. However, the port configuration display(s) may be located within the chassis 202 or on different surfaces of the chassis 202 while remaining within the scope of the present disclosure.

At least one port configuration button is included in the chassis 202. Each port configuration button is coupled to the port configuration engine 204 (e.g., by couplings between the port configuration button(s) and the processing system.) In the illustrated embodiment, a plurality of port configuration buttons 224, 226, 228, and up to 230 are located on a surface of the chassis 202. As discussed below, in some embodiments, a corresponding port configuration button is associated with each of the ports (e.g., the port configuration button 224 corresponding to the port 208, the port configuration button 226 corresponding to the port 210, the port configuration button 228 corresponding to the port 212, and the port configuration button 230 corresponding to the port 214). However, as also discussed below, in some embodiments, fewer port configuration buttons may be provided while allowing for the same functionality. Furthermore, one of skill in the art in possession of the present disclosure will recognize that different numbers of port configuration buttons other than those illustrated may provide the same functionality discussed below and thus will fall within the scope of the present disclosure. In the examples provided below, the port configuration button(s) are included in the chassis 202 such that they are accessible on the front surface 202a of the chassis 200. However, the port configuration button(s) may be located within the chassis 202 or on different surfaces of the chassis 202 while remaining within the scope of the present disclosure.

While a specific networking device 200 has been described, one of skill in the art in possession of the present disclosure will recognize that networking devices may include many other components and/or components in different configurations in order to provide a variety of conventional networking device functionality known in the art, and those networking devices will fall within the scope of the present disclosure. Furthermore, other types of information handlings systems having different components and/or configurations, including servers or storage devices that include ports that would benefit from the teachings of the present disclosure, are envisioned as falling within its scope as well.

Figure 3:
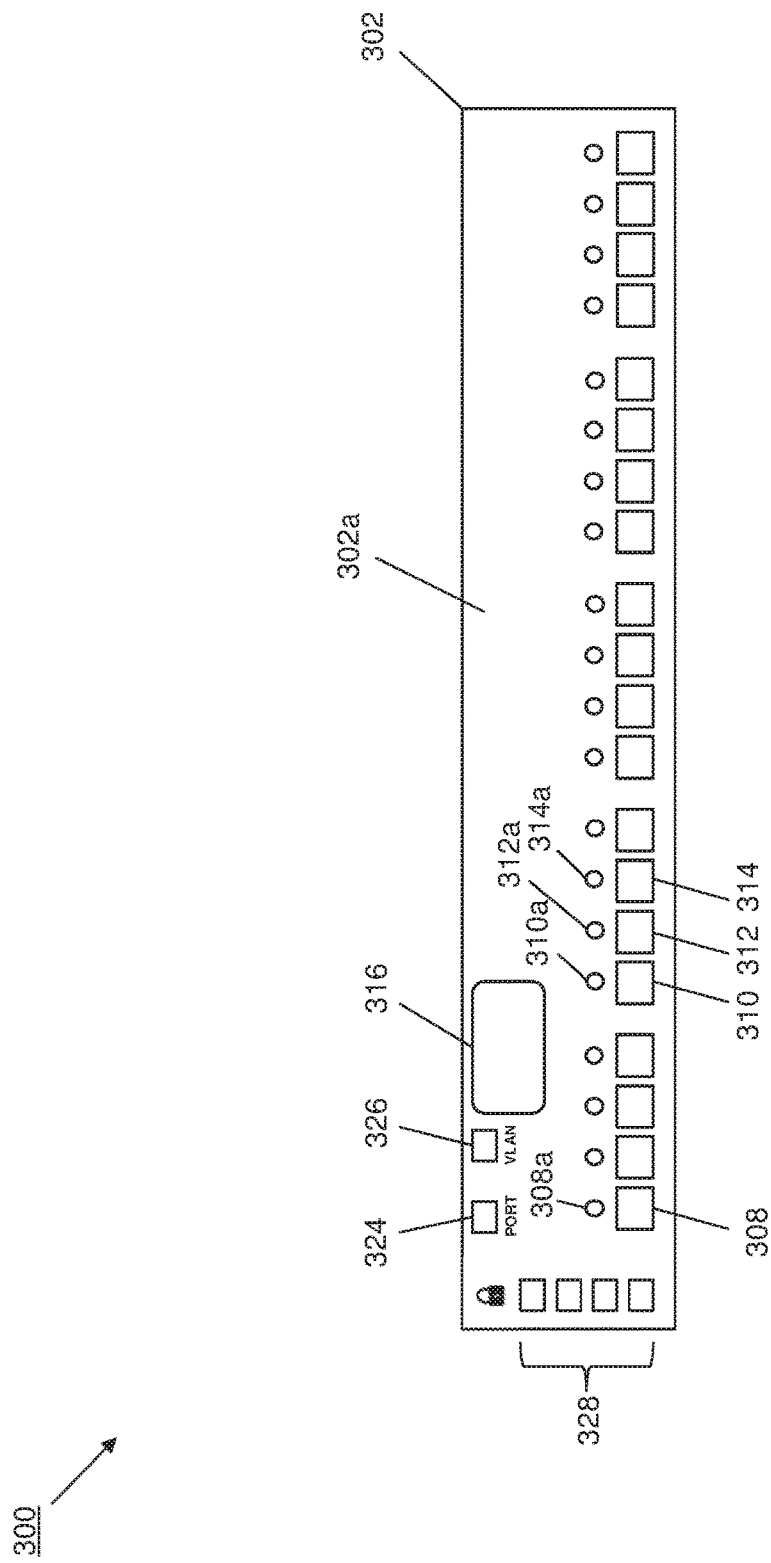
FIG. 3 is a front view illustrating an embodiment of the networking device of FIG. 2.

Referring now to FIG. 3, an embodiment of a networking device 300 is illustrated. In an embodiment, the networking device 300 may be the IHS 100 discussed above with reference to FIG. 1, and/or may include some or all of the components of the IHS 100. The networking device 300 may be provided by the networking device 200 discussed above with reference to FIG. 2, and thus similar elements are given similar reference numbers (i.e., 2xx element numbers from the networking device 200 correspond to 3xx elements numbers for the networking device 300.) In an embodiment, the networking device 300 provides a relatively low-cost version of the networking device 200 (i.e., relative to the other embodiments of networking devices discussed below) by including a single port configuration display and a reduced number of port configuration buttons.

In the illustrated embodiment, networking device 300 includes a chassis 302 having a front surface 302a. While not illustrated, the chassis 302 includes a port configuration engine and a port configuration database that may be substantially similar to the port configuration engine 204 and port configuration database 206 included in the networking device 200 discussed above. A plurality of ports are included in the chassis 302 and located on the chassis 302 such that they are accessible on the front surface 302a of the chassis 302. For reference to the discussions in the examples below, particular ports are identified as port 308, port 310, port 312, and port 314. Each of the ports is associated with a respective port indicator that is located on the chassis 302 such that it is visible on the front surface 302a of the chassis 302 immediately adjacent that port. For reference to the discussions in the examples below, particular port identifiers are identified as port identifier 308a associated with and located immediately adjacent port 308, port identifier 310a associated with and located immediately adjacent port 310, port identifier 312a associated with and located immediately adjacent port 312, and port identifier 314a associated with and located immediately adjacent port 314. A port configuration display 316 is included in the chassis 302 such that it is visible on the front surface 302a of the chassis 300. A plurality of port configuration buttons are included in the chassis 302, are accessible on the front surface 302a of the chassis 302, and are provided by a "PORT" selector port configuration button 324, a "VLAN" selector port configuration button 326, and a plurality of "security code" provisioning port configuration buttons 328.

Figure 4:
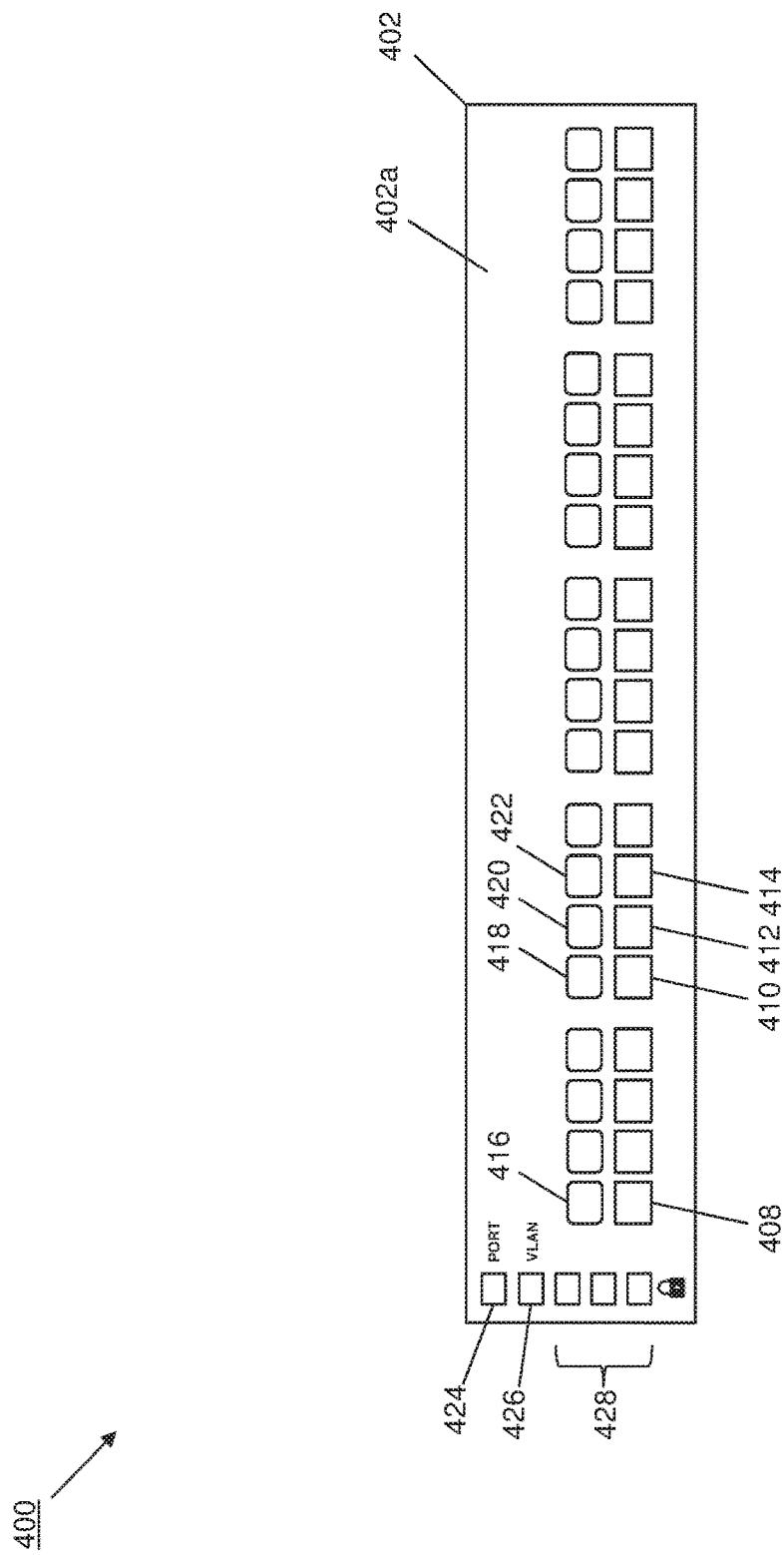
FIG. 4 is a front view illustrating an embodiment of the networking device of FIG. 2.

Referring now to FIG. 4, an embodiment of a networking device 400 is illustrated. In an embodiment, the networking device 400 may be the IHS 100 discussed above with reference to FIG. 1, and/or may include some or all of the components of the IHS 100. The networking device 400 may be provided by the networking device 200 discussed above with reference to FIG. 2, and thus similar elements are given similar reference numbers (i.e., 2xx element numbers from the networking device 200 correspond to 4xx elements numbers for the networking device 400.) In an embodiment, the networking device 400 provides a relatively medium-cost version of the networking device 200 (i.e., relative to the other embodiments of networking devices described herein) by including a respective port configuration display for each port, but a reduced number of port configuration buttons.

In the illustrated embodiment, networking device 400 includes a chassis 402 having a front surface 402*a*. While not illustrated, the chassis 402 includes a port configuration engine and a port configuration database that may be substantially similar to the port configuration engine 204 and port configuration database 206 included in the networking device 200 discussed above. A plurality of ports are included in the chassis 402 and located on the chassis 402 such that they are accessible on the front surface 402*a* of the chassis 402. For reference to the discussions in the examples below, particular ports are identified as port 408, port 410, port 412, and port 414. Each of the ports is associated with a respective port configuration display that is included in the chassis 402 such that it is visible on the front surface 402*a* of the chassis 402 immediately adjacent that port. For reference to the discussions in the examples below, particular port configuration displays are identified as port configuration display 416 associated with and located immediately adjacent port 408, port configuration display 418 associated with and located immediately adjacent port 410, port configuration display 420 associated with and located immediately adjacent port 412, and port configuration display 422 associated with and located immediately adjacent port 414. It should be recognized that the networking device 400 provides an embodiment in which port indicators (e.g., the port indicators 208*a*, 210*a*, 212*a*, and 214*a* on the networking device 200) have been omitted, with their functionality provided by the port configurations displays as discussed below. A plurality of port configuration buttons are included in the chassis 402 and are accessible on the front surface 402*a* of the chassis 402, and are provided by a "PORT" selector port configuration button 424, a "VLAN" selector port configuration button 426, and a plurality of "security code" provisioning port configuration buttons 428.

Figure 5:
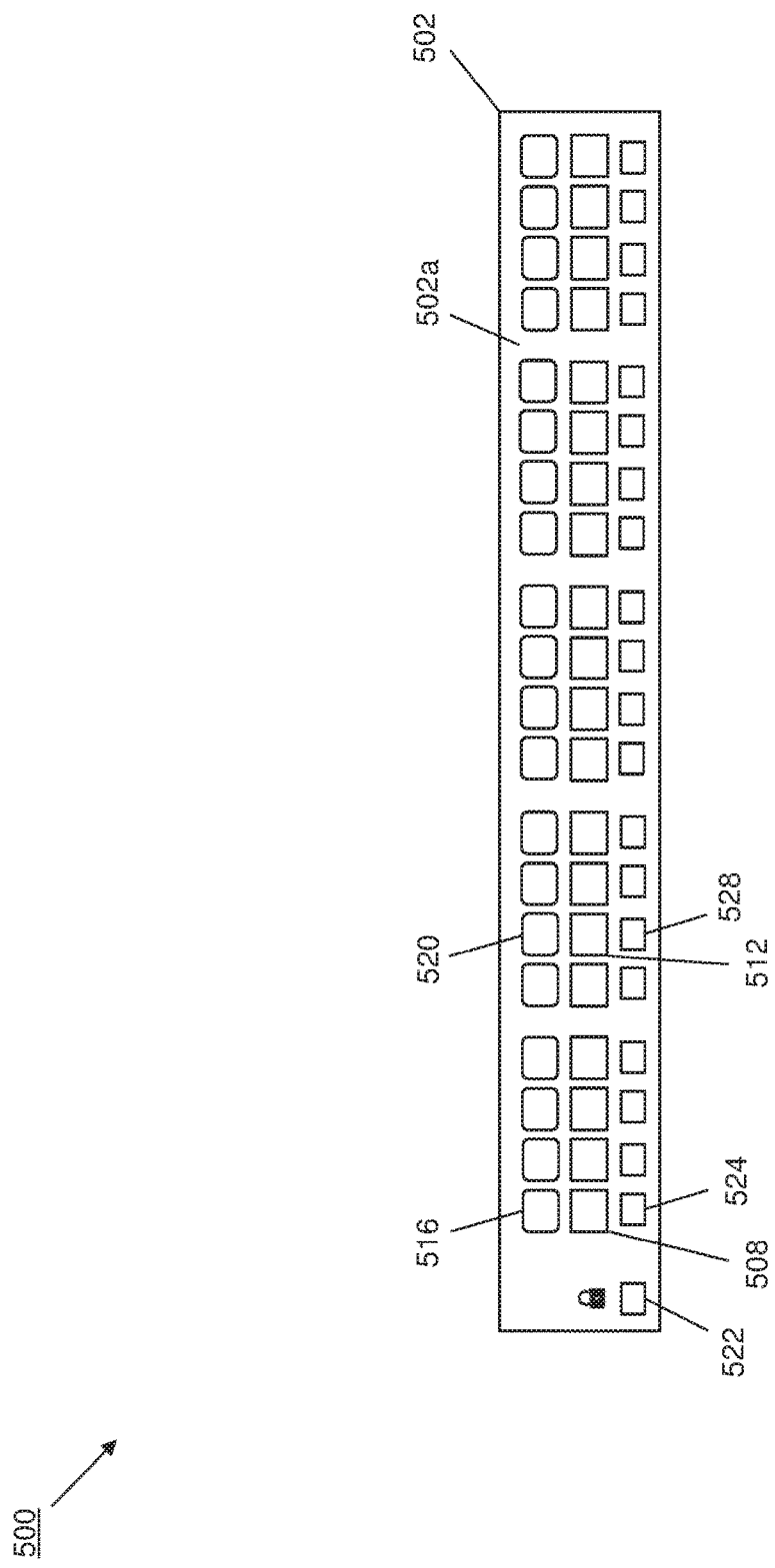
FIG. 5 is a front view illustrating an embodiment of the networking device of FIG. 2.

Referring now to FIG. 5, an embodiment of a networking device 500 is illustrated. In an embodiment, the networking device 500 may be the IHS 100 discussed above with reference to FIG. 1, and/or may include some or all of the components of the IHS 100. The networking device 500 may be provided by the networking device 200 discussed above with reference to FIG. 2, and thus similar elements are given similar reference numbers (i.e., 2*xx* element numbers from the networking device 200 correspond to 5*xx* elements numbers for the networking device 500.) In an embodiment, the networking device 500 provides a relatively high-cost version of the networking device 200 (i.e., relative to the other embodiments of networking devices described herein) by including a respective port configuration display for each port, and a respective port configuration button for each port.

In the illustrated embodiment, networking device 500 includes a chassis 502 having a front surface 502*a*. While not illustrated, the chassis 502 includes a port configuration engine and a port configuration database that may be substantially similar to the port configuration engine 204 and port configuration database 206 included in the networking device 200 discussed above. A plurality of ports are included in the chassis 502 and located on the chassis 502 such that they are accessible on the front surface 502*a* of the chassis 502. For reference to the discussions in the examples below, particular ports are identified as port 508 and port 512. Each of the ports is associated with a respective port configuration display that is included in the chassis 502 such that it is visible on the front surface 502*a* of the chassis 502 immediately adjacent that port. For reference to the discussions in the examples below, particular port configuration displays are identified as port configuration display 516 associated with and located immediately adjacent port 508, and port configuration display 520 associated with and located immediately adjacent port 512. It should be recognized that the networking device 500 provides an embodiment in which port indicators (e.g., the port indicators 208*a*, 210*a*, 212*a*, and 214*a* on the networking device 200) have been omitted, with their functionality provided by the port configurations displays as discussed below. A plurality of port configuration buttons are included in the chassis 502 and are accessible on the front surface 502*a* of the chassis 502, with a respective port configuration button provided immediately adjacent each port. For reference to the discussions in the examples below, the port configuration buttons are identified by "port-specific" port configuration button 524 associated with and located immediately adjacent port 508, "port-specific" port configuration button 528 associated with and located immediately port 512, and "security code" port configuration button 522.

Figure 6:
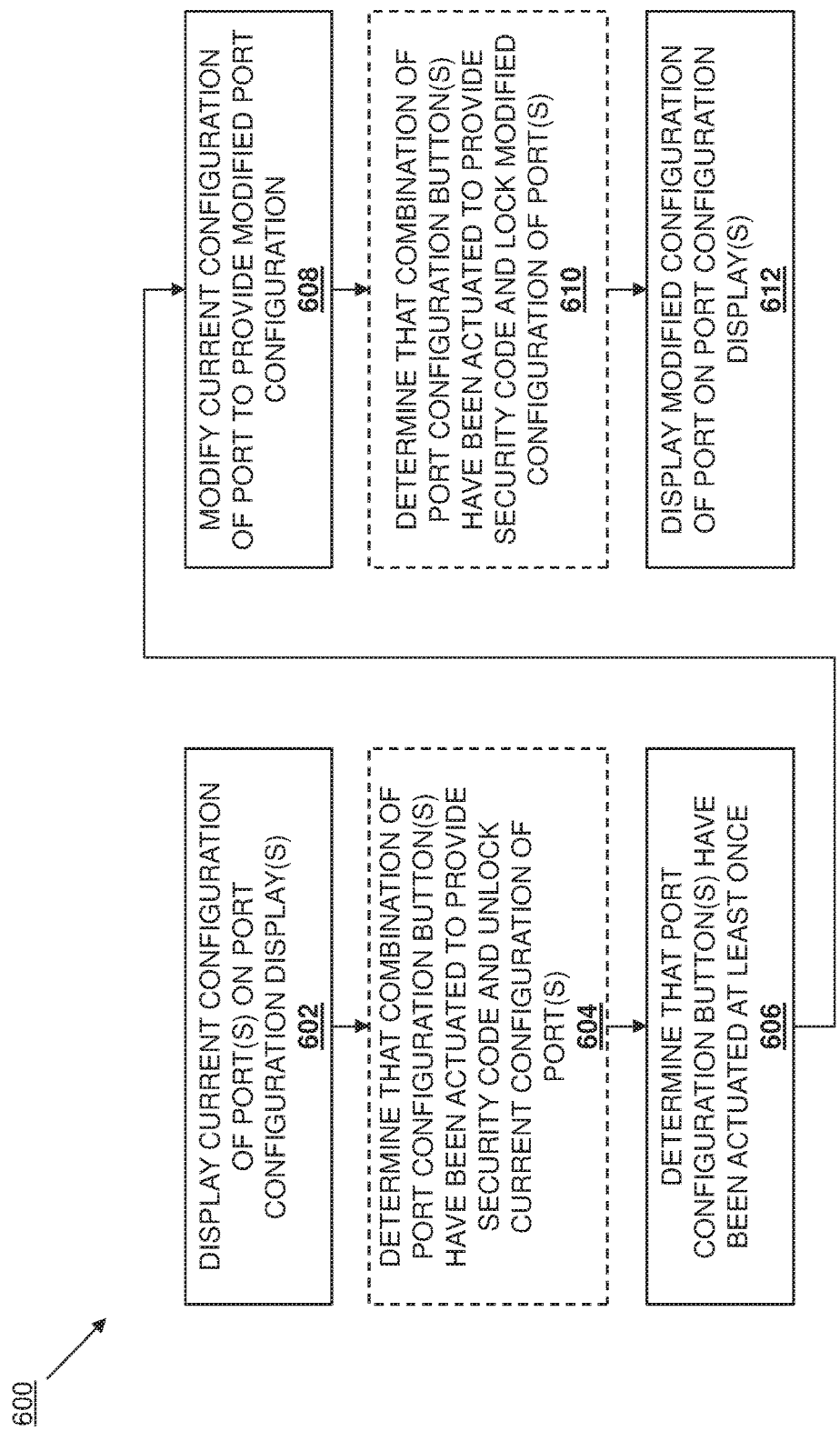
FIG. 6 is a flow chart illustrating an embodiment of a method for configuring a networking device.

Referring now to FIG. 6, an embodiment of a method 600 for configuring a networking device is illustrated. As discussed below, embodiments of the systems and methods of the present disclosure provide a networking device having port configuration button(s) and port configuration display(s) that are accessible and visible on a surface of the networking device to provide for the configuration of that networking device without the need for a management network, console cabling, console ports, web user interfaces, command line coding, management devices (e.g., a laptop computer), technical networking expertise, and/or technical support. Rather, the port configuration button(s) and port configuration display(s) are combined with the port configuration engine and other features of the networking device to provide extremely intuitive networking device configuration that may eliminate the need for a user help guide (or limit that user help guide to a 1-page instruction sheet that describes the actions discussed below). As discussed in detail below, the port configuration button(s) may be actuated to select any port on the networking device, and then actuated again to assign that port a Virtual Local Area Network (VLAN), provide that port a trunking designation, provide that port a Link Aggregation Group (LAG) designation, and/or configuration that port in a variety of other manners that would be apparent to one of skill in the art in possession of the present disclosure. Furthermore, the port configuration display(s) may then display the configuration of the ports to allow a user to quickly and easily ascertain the configuration of each port and make changes to those configurations if desired.

The method 600 begins at block 602 where a current configuration of one or more ports is displayed on one or more port configuration displays. In an embodiment, the port configuration engine 204 operates at block 602 to provide a current configuration for one or more ports for display on the port configuration display(s) 216, 218, 220, and/or 222. For example, as discussed below, in situations where the networking device 200 has not yet been configured, or is reset, rebooted, and/or otherwise initialized, each of the ports on the networking device 200 may be associated with configuration (e.g., a "default" configuration) in the port configuration database 206 (e.g., in the port configuration table discussed above). As such, at block 602 the port configuration engine 204 may access the port configuration database 206, retrieve the current configuration for the port(s), and provide that current configuration for display on the port configuration display(s). In a specific embodiment, the default configuration for the networking device 200 may be an unmanaged operational mode that provides each of the ports assigned to the same VLAN (e.g., VLAN 001 discussed below) and that allows devices connected to those ports to communicate with each other without a need to perform any configuration operations on the networking device 200 (e.g., without the need to perform the configuration operations discussed below according to the method 600).

Figure 7A:
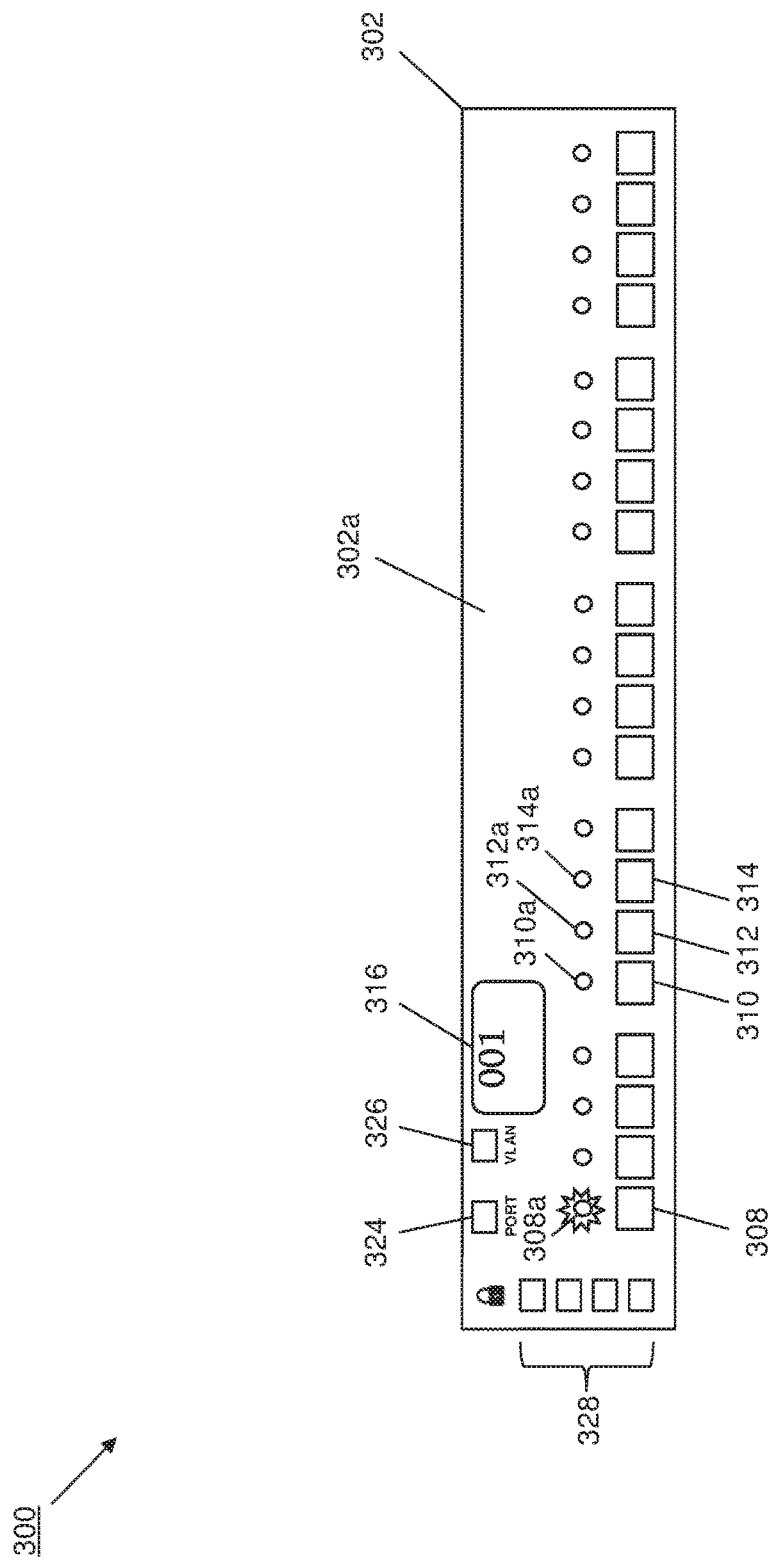
FIG. 7*a* is a front view illustrating an embodiment of the networking device of FIG. 3 during configuration according to the method of FIG. 6.

For example, with reference to FIG. 7a, the networking device 300 is illustrated in an unconfigured or initialized mode. As discussed in further detail below, any one of the port indicators on the networking device 300 may be activated to indicate to a user that its associated port is "selected" for current configuration identification and/or modification, and FIG. 7a illustrates how the port configuration engine 204 may cause the port indicator 308a that is associated with the port 308 to be activated on the unconfigured/initialized networking device 300 (i.e., the port configuration engine 204 initially causes the "first" port 308 on the networking device 300 to be identified on an unconfigured/initialized networking device 300). Furthermore, at block 602, the port configuration engine 204 accesses the port configuration database 206 and operates to retrieve the current configuration of the port 308 that is identified/selected as indicated by its port indicator 308a, and provides that current configuration (e.g., a default configuration in this case) for display on the port configuration display 316.

In the illustrated embodiment, the current configuration of the port 308 is displayed as "001" to indicate that the port is assigned to VLAN 001, and in some embodiments, each of the ports on the unconfigured/networking device 300 may be automatically assigned to VLAN 001 as a default configuration. However, one of skill in the art in possession of the present disclosure will recognize that a current configuration or default configuration displayed at block 602 may be any of a variety of configurations known in the art. Furthermore, while the display of the current configuration at block 602 is described as a default configuration, at block 602 the networking device 300 may have been previously configured (as discussed below) and the current configurations of the ports may be any of the variety of configurations discussed below that have been previously selected by the user. Further still, while the current configuration is illustrated as displayed on the port configuration display 316 using 7-segment LED elements for each number (i.e., which one of skill in the art will recognize provides a lower cost port configuration display), one of skill in the art in possession of the present disclosure will recognize that different types of display devices may be utilized for the port configuration display to provide more detailed displays of the current configuration (e.g., displaying "VLAN 001" or other detailed information.)

Figure 7B:
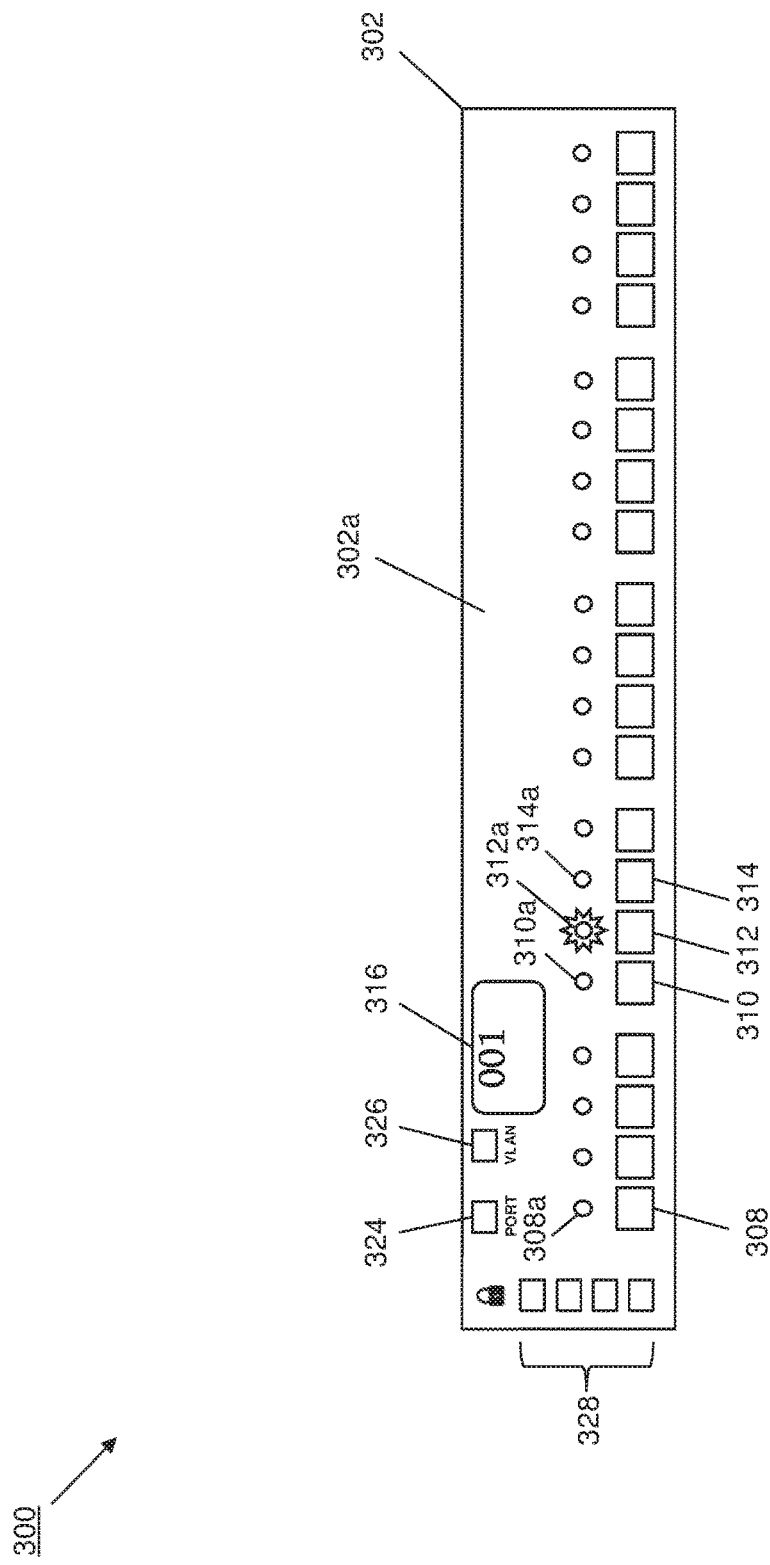
FIG. 7*b* is a front view illustrating an embodiment of the networking device of FIG. 3 during configuration according to the method of FIG. 6.

With reference to both FIGS. 7a and 7b, the selection of a different port and display of the current configuration of that different port is illustrated. In the illustrated embodiment, the user may actuate the "PORT" selector port configuration button 324 on the networking device 300 in order to select a different port on the networking device 300 and view the current configuration of that port. Activation of the "PORT" selector port configuration button 324 operates to deactivate the currently activated port indicator (e.g., the port indicator 308a associate with port 308 illustrated in FIG. 7a), and activate the immediately adjacent port indicator (e.g., the port indicator that is located to the immediate right of the port indicator 308a and that is associated with the port that is located to the immediate right of the port 308 in FIG. 7a). For example, four actuations of the "PORT" selector port configuration button 324 may cause the port configuration engine 204 to activate the port indicator 310a that is associated with the port 310, five actuations of the "PORT" selector port configuration button 324 may cause the port configuration engine 204 to activate the port indicator 312a that is associated with the port 312 (as illustrated in FIG. 7b), and six actuations of the "PORT" selector port configuration button 324 may cause the port configuration engine 204 to activate the port indicator 314a that is associated with the port 314. As such, one of skill in the art in possession of the present disclosure will recognize how the "PORT" selector port configuration button 324 may be actuated by the user to select any of the ports on the networking device 300 for current configuration viewing and/or modification. With reference to the embodiment illustrated in FIG. 7b, the selection of the port 312 causes the port configuration engine 204 to access the port configuration database 206 and retrieve the current configuration of the port 312 that is identified/selected as indicated by its port indicator 312a, and provide that current configuration (e.g., the default configuration of VLAN 001 in this case) for display on the port configuration display 316 (i.e., "001").

Figure 8A:
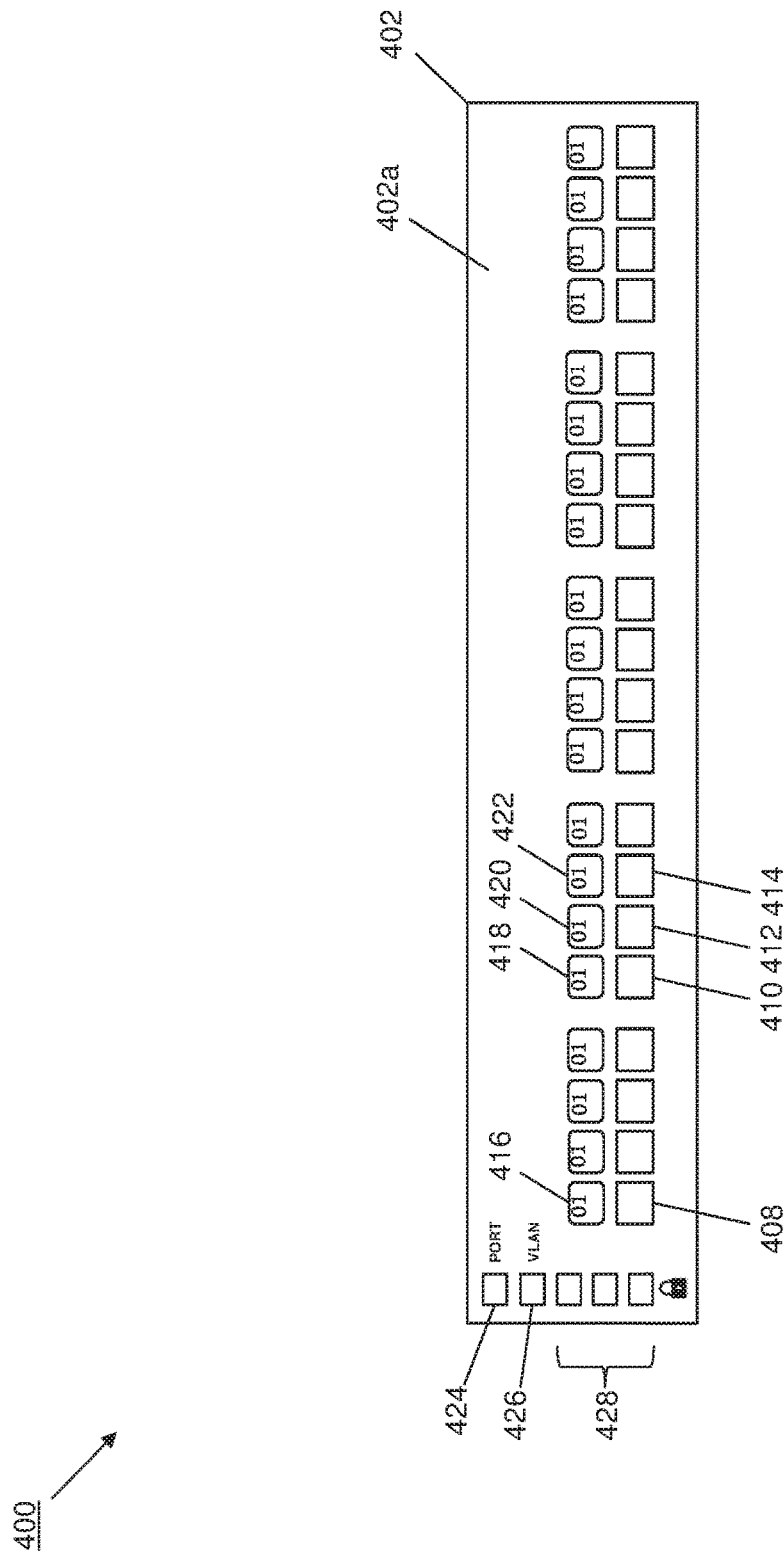
FIG. 8a is a front view illustrating an embodiment of the networking device of FIG. 4 during configuration according to the method of FIG. 6.

In another example, with reference to FIG. 8a, the networking device 400 is illustrated in an unconfigured or initialized mode. At block 602, the port configuration engine 204 accesses the port configuration database 206 and operates to retrieve the current configuration of each of the ports on the networking device 400, and provides those current configurations (e.g., default configurations in this case) on the respective port configuration displays that are associated with those ports. In the illustrated embodiment, the current configurations of the ports (e.g., ports 416, 418, 420, and 422, as well as each of the other ports on the networking device 400) are displayed as "01" on their respective port configuration displays (e.g., port configuration display 416 associated with port 408, port configuration display 418 associated with port 410, port configuration display 420 associated with port 412, and port configuration display 422 associated with port 414, as well as each of the other port configuration displays associated with each of the other ports on the networking device 400) to indicate that each of the ports is assigned to VLAN 01. In some embodiments, each of the ports on the unconfigured/networking device 400 may be automatically assigned to VLAN 01 as a default configuration. However, one of skill in the art in possession of the present disclosure will recognize that a current configuration or default configuration displayed at block 602 may be any of a variety of configurations known in the art. Furthermore, while the display of the current configurations at block 602 is described as a default configuration, at block 602 the networking device 400 may have been previously configured (as discussed below) and the current configurations of the ports may be any of the variety of configurations discussed below that have been previously selected by the user. Further still, while the current configuration is illustrated as displayed on the port configuration displays using 7-segment LED elements for each number (i.e., which one of skill in the art will recognize provides for lower cost port configuration displays), one of skill in the art in possession of the present disclosure will recognize that different types of display devices may be utilized for the port configuration displays to provide more detailed displays of the current configuration (e.g., displaying "VLAN 01" or other detailed information.)

Figure 9A:
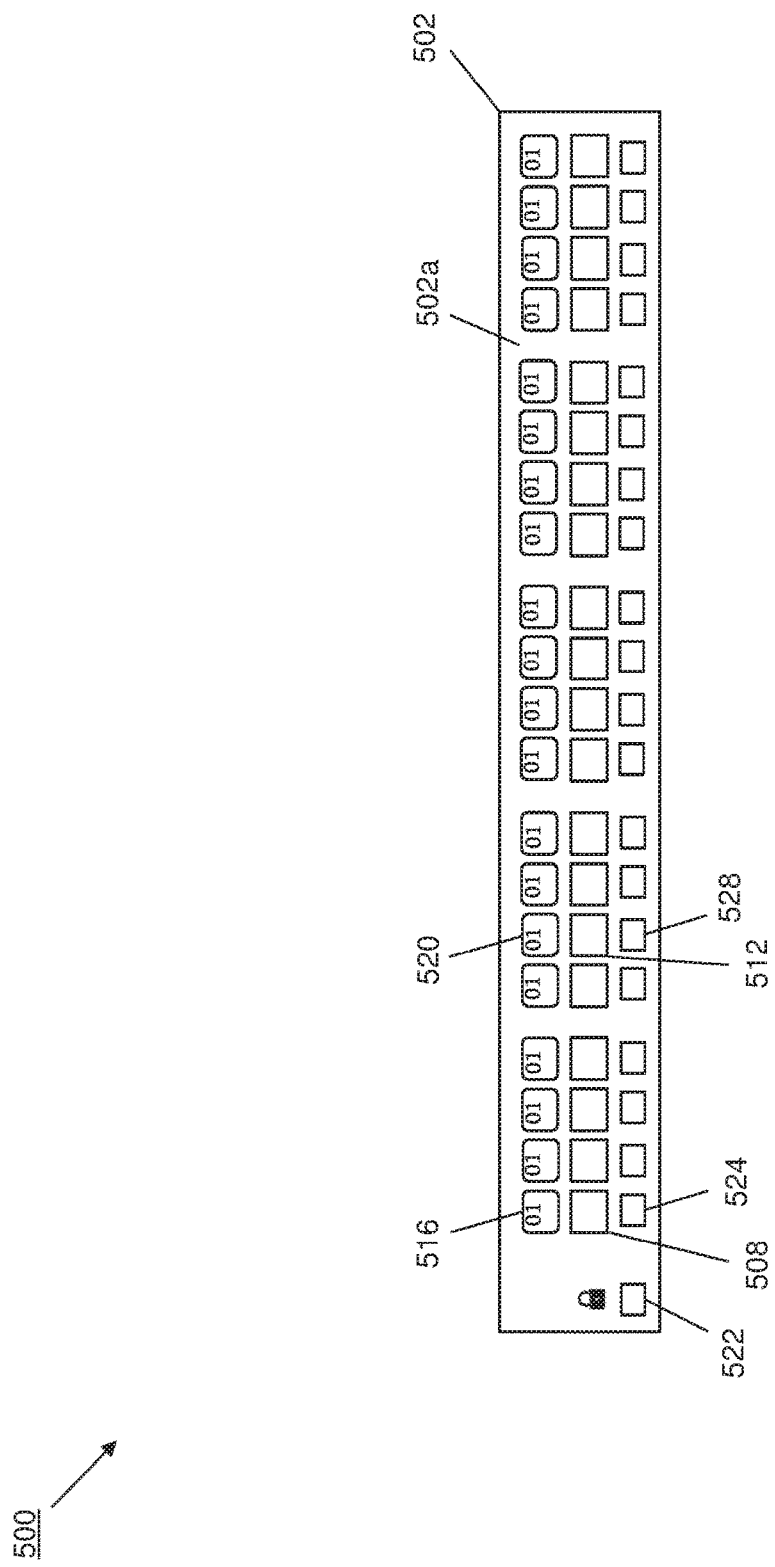
FIG. 9a is a front view illustrating an embodiment of the networking device of FIG. 5 during configuration according to the method of FIG. 6.

In another example, with reference to FIG. 9a, the networking device 500 is illustrated in an unconfigured or initialized mode. At block 602, the port configuration engine 204 accesses the port configuration database 206 and operates to retrieve the current configuration of each of the ports on the networking device 500, and provides those current configurations (e.g., default configurations in this case) on the respective port configuration displays that are associated with those ports. In the illustrated embodiment, the current configurations of the ports (e.g., ports 508 and 512, as well as each of the other ports on the networking device 500) are displayed as "01" on their respective port configuration displays (e.g., port configuration display 5156 associated with port 508, and port configuration display 520 associated with port 512, as well as each of the other port configuration displays associated with each of the other ports on the networking device 500) to indicate that each of the ports is assigned to VLAN 01. In some embodiments, each of the ports on the unconfigured/networking device 500 may be automatically assigned to VLAN 01 as a default configuration. However, one of skill in the art in possession of the present disclosure will recognize that a current configuration or default configuration displayed at block 602 may be any of a variety of configurations known in the art. Furthermore, while the display of the current configurations at block 602 is described as a default configuration, at block 602 the networking device 500 may have been previously configured (as discussed below) and the current configurations of the ports may be any of the variety of configurations discussed below that have been previously selected by the user. Further still, while the current configuration is illustrated as displayed on the port configuration displays using 7-segment LED elements for each number (i.e., which one of skill in the art will recognize provides a lower cost port configuration display), one of skill in the art in possession of the present disclosure will recognize that different types of display devices may be utilized for the port configuration displays to provide more detailed displays of the current configuration (e.g., displaying "VLAN 01" or other detailed information.)

The method 600 may then proceed to optional block 604 where it is determined that a combination of port configuration button(s) have been actuated to provide a security code, and the current configuration of the one or more port(s) is unlocked. In some embodiments, the port configuration engine 204 may be configured to "lock" configurations of the ports on the networking device 200 such that they may not be modified without the receipt of a security code. However, in other embodiments, optional block 604 may be omitted (i.e., when unauthorized modification of configurations provided by the networking device 200 is not a concern.) As discussed below, one or more buttons may be provided on the networking device 200 for providing the security code, and any combination or types of actuations (e.g., actuating the same port configuration button more than once, distinguishing actuations of a single port button based on the amount of time that port configuration button is actuated, etc.) will fall within the scope of the present disclosure.

While the networking device 200 discussed below utilizes the port configuration buttons 224, 226, 228, and 230 for provisioning of the security code at optional block 604 (e.g., to provide a lower cost networking device with fewer buttons), other embodiments of the present disclosure may provide a networking device with dedicated buttons for providing the security code, a display for providing the security code, and/or a variety of other security code provisioning devices known in the art. Furthermore, a variety of security code programming techniques, security code recovery techniques, and/or other security code functionality may be enabled by the port configuration engine 204 and port configurations buttons while remaining within the scope of the present disclosure. Further still, in some embodiments security operations on the networking device 200 may be enabled by a security key (e.g., a "thumb drive" or other device that is insertable into one of the ports on the networking device 200) and that may provide the security code, as well as instructions for providing security code programming techniques, security code recovery techniques, and/or other security code functionality utilized by the networking device. For example, such security keys may be provided when the port configuration buttons on the networking device 200 limit the ability of the user to perform complex operations such as the security functionality discussed above.

In an embodiment of optional block 604, the port configuration engine 204 may detect a user actuating a combination of the plurality of port configuration buttons 224-230, determine that that combination corresponds to a security code (e.g., stored in the port configuration database 206) and, in response, unlock the current configuration of the ports on the networking device 200 such that that current configuration may be modified as discussed below. For example, at optional block 604 and in response to receiving the security code, the port configuration engine 204 may unlock access to the port configuration table in the port configuration database 206 such that modification of entries in the port configuration table is allowed.

Referring now to FIG. 7b, in an embodiment of optional block 604, the user may actuate a combination of the plurality of "security code" provisioning port configuration buttons 328 on the networking device 300 that corresponds to the security code discussed above, and the port configuration engine 204 may then unlock the current configuration of the port(s) on the networking device 300. In some examples, the provisioning of the security code at optional block 604 may unlock the current configuration of all of the ports on the networking device 300. However, in other examples, the provisioning of the security code at optional block 604 may only unlock the current configuration of the "selected" port (e.g., port 312 in FIG. 7b) on the networking device 300 (i.e., the security code may be required on a port-by-port basis to provide a higher level of security.)

Figure 8B:
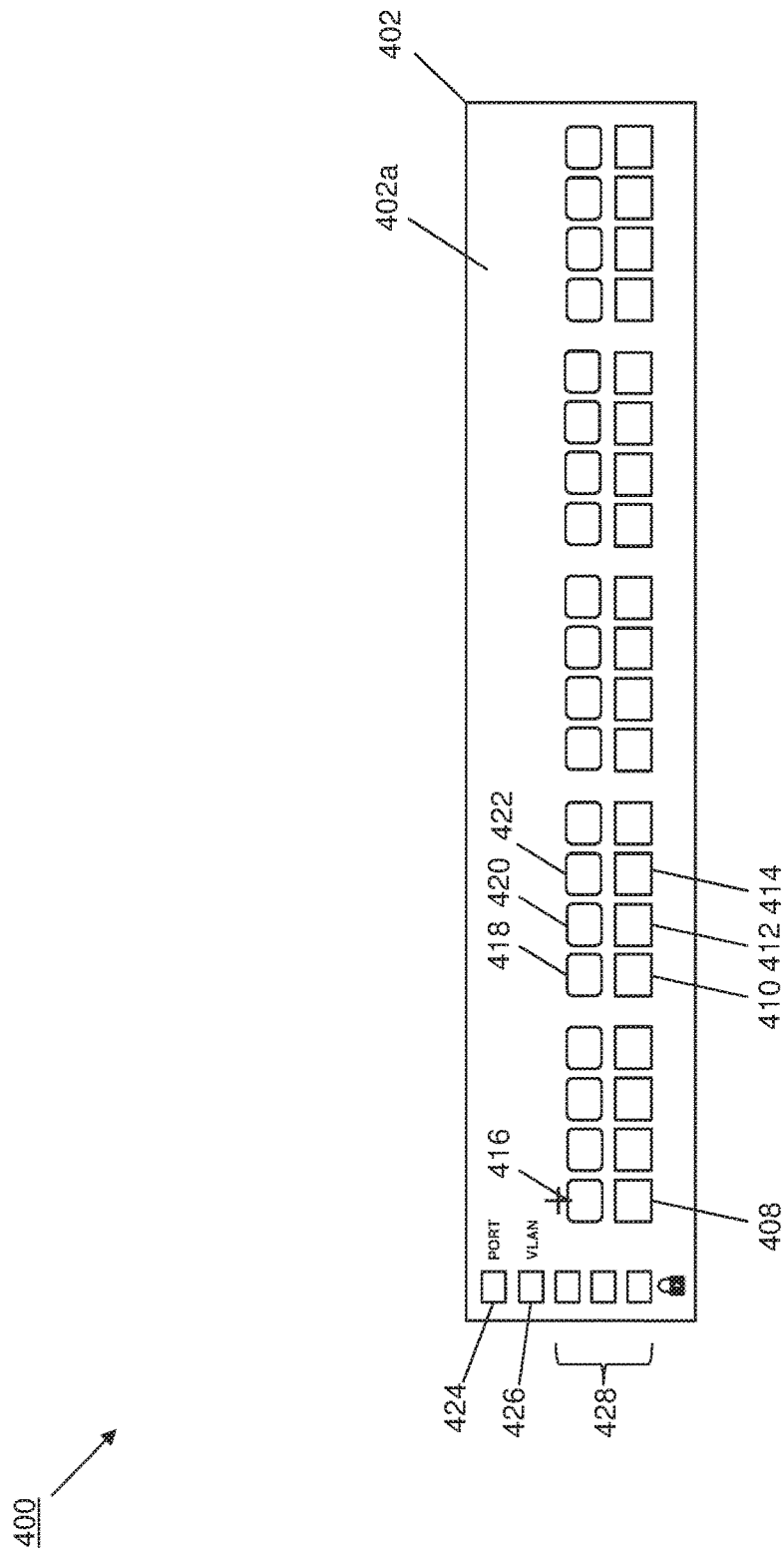
FIG. 8b is a front view illustrating an embodiment of the networking device of FIG. 4 during configuration according to the method of FIG. 6.
Figure 8C:
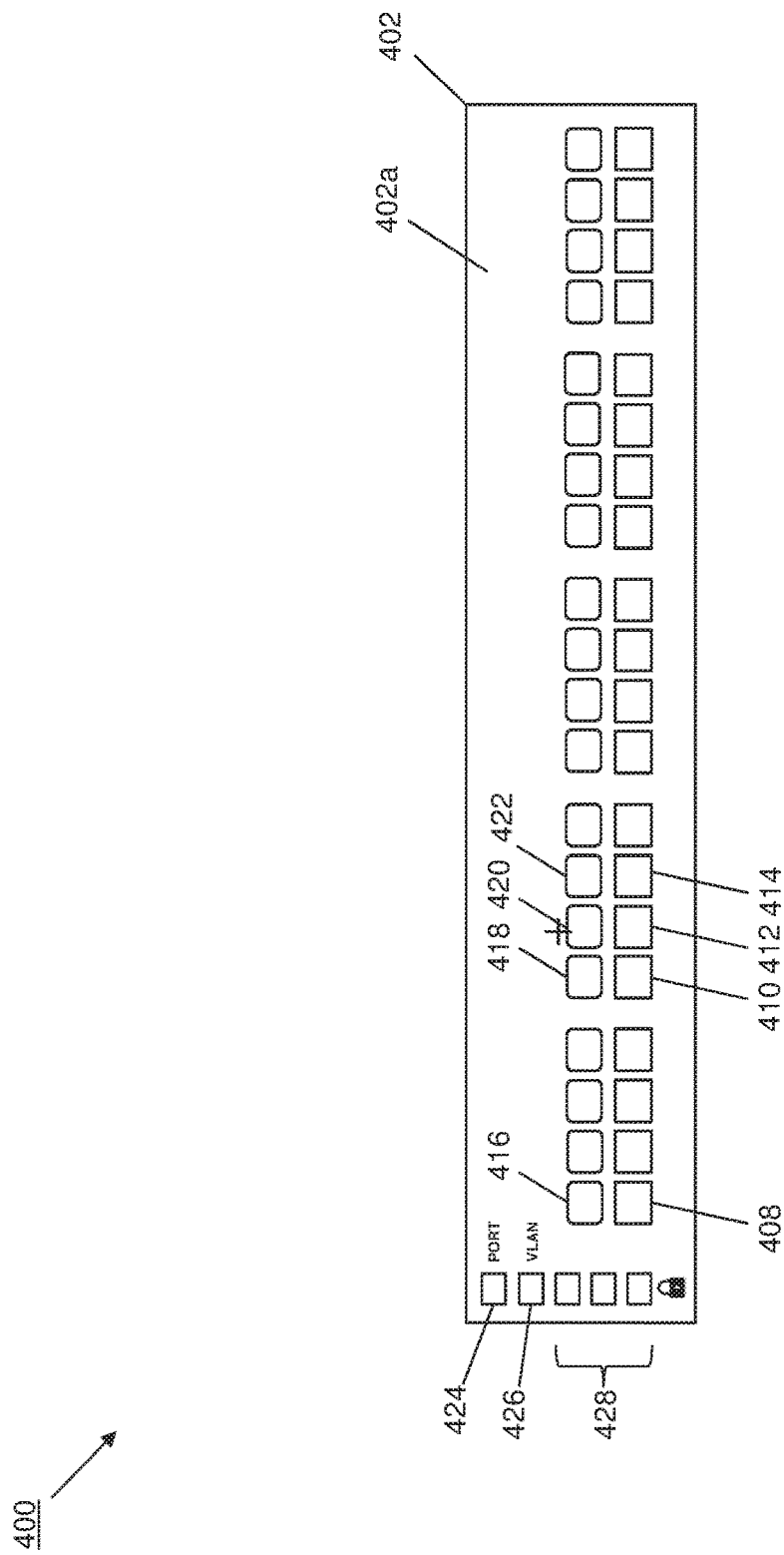
FIG. 8c is a front view illustrating an embodiment of the networking device of FIG. 4 during configuration according to the method of FIG. 6.

Referring now to FIGS. 8a, 8b, and 8c, in an embodiment of optional block 604, the user may actuate a combination of the plurality of "security code" provisioning port configuration buttons 428 on the networking device 400 that corresponds to the security code discussed above, and the port configuration engine 204 may then unlock the current configuration of the port(s) on the networking device 400. In some examples, the provisioning of the security code at optional block 604 may unlock the current configuration of all of the ports on the networking device 400. However, in other examples, the provisioning of the security code at optional block 604 may only unlock the current configuration of a "selected" port on the networking device 400 (i.e., the security code may be required on a port-by-port basis to provide a higher level of security), discussed below.

With reference to FIGS. 8b and 8c, the selection of ports on the networking device 400 is illustrated. In the illustrated embodiment, the user may actuate the "PORT" selector port configuration button 424 on the networking device 400 in order to select a port on the networking device 400. For example, the respective port configuration display associated with any one of the ports on the networking device 400 may indicate to a user that its associated port is "selected", and FIG. 8b illustrates how the port configuration engine 204 may cause the port configuration display 416 that is associated with the port 408 to provide an indication that the port 408 is selected (e.g., in response to the user initially actuating the "PORT" selector port configuration button 424 after the display of the current configurations of the ports illustrated in FIG. 8a). Furthermore, FIG. 8c illustrates how five subsequent actuations of the "PORT" selector port configuration button 424 may cause the port configuration engine 204 to cause the port configuration display 420 that is associated with the port 412 to provide an indication that the port 412 is selected. As such, one of skill in the art in possession of the present disclosure will recognize how the "PORT" selector port configuration button 424 may be actuated by the user to select any of the ports on the networking device 400, and then the security code provided to unlock that port.

Referring now to FIG. 9a, in an embodiment of optional block 604, the user may actuate a combination of the plurality of the port configuration buttons on the networking device 500 that corresponds to the security code discussed above, and the port configuration engine 204 may then unlock the current configuration of the port(s) on the networking device 500. For example, the user may actuate the "security code" port configuration button 522 to indicate to the port configuration engine 204 that a security code is about to be provided, and then actuate a combination of the port configuration buttons on the networking device 500 (e.g., the port configuration button 524, the port configuration button 528, and/or any of the other port configuration buttons on the networking device 500) to provide the security code. In some examples, the provisioning of the security code at optional block 604 may unlock the current configuration of all of the ports on the networking device 500. However, in other examples, the provisioning of the security code at optional block 604 may only unlock the current configuration of a "selected" port on the networking device 500 (i.e., the security code may be required on a port-by-port basis to provide a higher level of security). For example, the user may actuate the "port-specific" port configuration button 524 to select the port 508, the user may actuate the "port-specific" port configuration button 528 to select the port 512, and may actuator any other "port-specific" port configuration button associated with and located immediately adjacent a respective port in order to select that port, and then the security code provided to unlock that port.

The method 600 then proceeds to block 606 where it is determined that the port configuration button(s) have been actuated at least once. As discussed above, in some embodiments the port configuration buttons 224-230 may be actuated in order to select a port. Furthermore, port configuration buttons 224-230 may also be actuated to modify the configuration of a selected port. At block 606, the port configuration engine 204 may monitor and detect the actuation of the port configuration buttons 224-230 for actuation in order to determine that a port has been selected and/or determine that an instruction has been received to modify the current configuration of the selected port.

Referring now to FIGS. 7a, 7b, 7c, 7d, and 7e, at block 606 the port configuration engine 204 in the networking device 300 may detect that the port configuration buttons on the networking device 300 have been actuated a plurality of times and, in response, may cause the port indicator associated with a selected port to indicate that that port has been selected based on the actuation of the port configuration buttons, and then cause the port configuration display 316 to display a modified configuration based on the actuation of the port configuration buttons. For example, as discussed above, the port indicator 308a associated with the port 308 may be activated as illustrated in FIG. 7a, and the port configuration engine 204 may then detect five actuations of the "PORT" selector port configuration button 324 and, in response, cause the port indicator 312a that is associated with the port 312 to be activated, as illustrated in FIG. 7b. Then port configuration engine 204 may then detect actuation of the "VLAN" selector port configuration button 326 on the networking device 300 and operate to provide a modified configuration for display on the port configuration display 316.

Figure 7C:
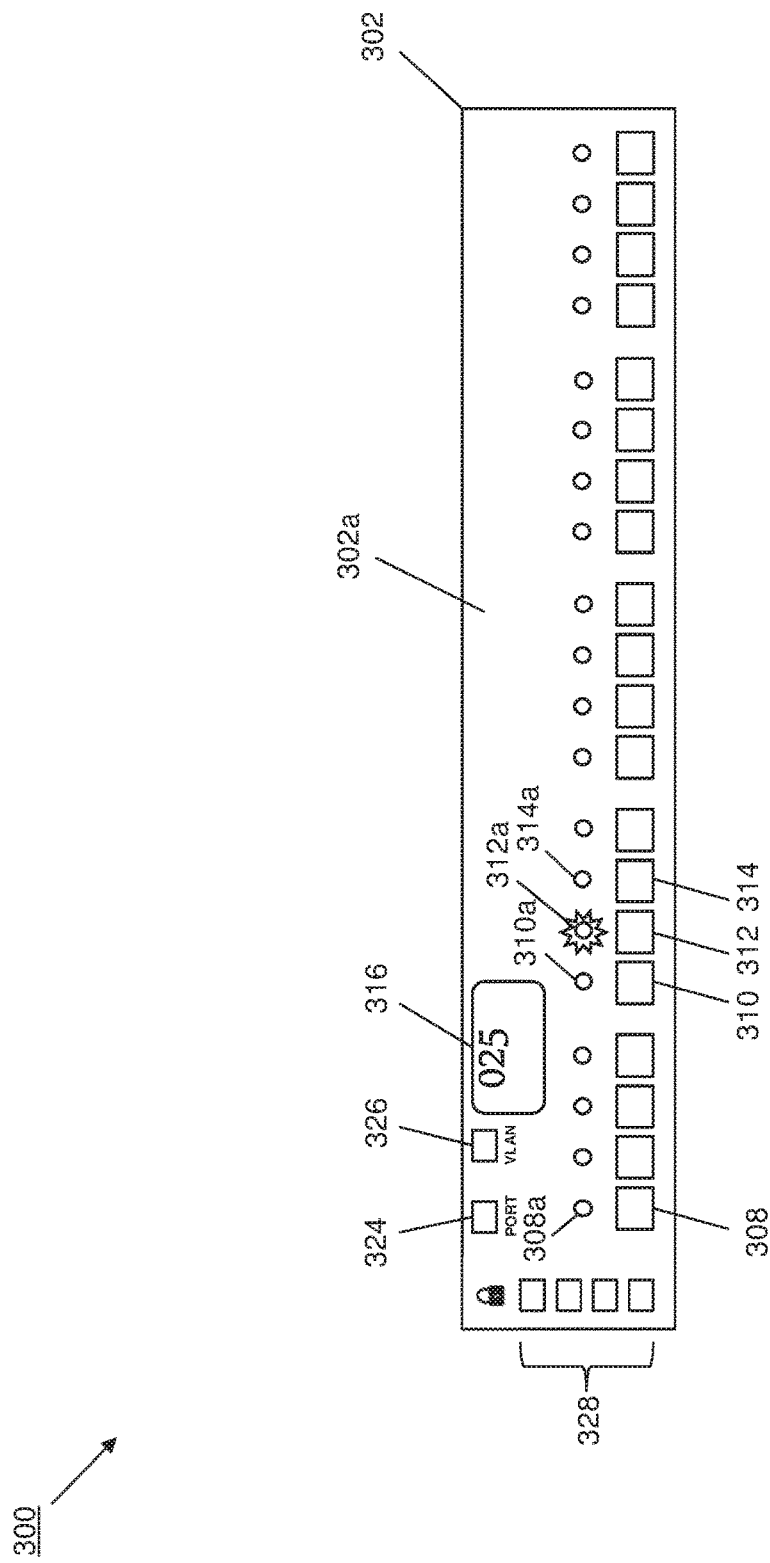
FIG. 7*c* is a front view illustrating an embodiment of the networking device of FIG. 3 during configuration according to the method of FIG. 6.

For example, FIG. 7c illustrates the port configuration engine 204 having caused the port configuration display 316 to display a modified configuration "025" that indicates to the user that they have selected to assign the port 312 to VLAN 025. The modified configuration displayed on the port configuration display 316 in FIG. 7c may result from 25 actuations of the "VLAN" selector port configuration button 326, an actuation of the "VLAN" selector port configuration button 326 that "holds down" the "VLAN" selector port configuration button 326 and causes the modified configuration displayed on the port configuration display 316 to quickly cycle through available modified configurations (e.g., to quickly advance from VLAN 001 (i.e., "001") to VLAN 025 (i.e., "025")), and/or using a variety of other techniques that would be apparent to one of skill in the art in possession of the present disclosure.

Figure 7D:
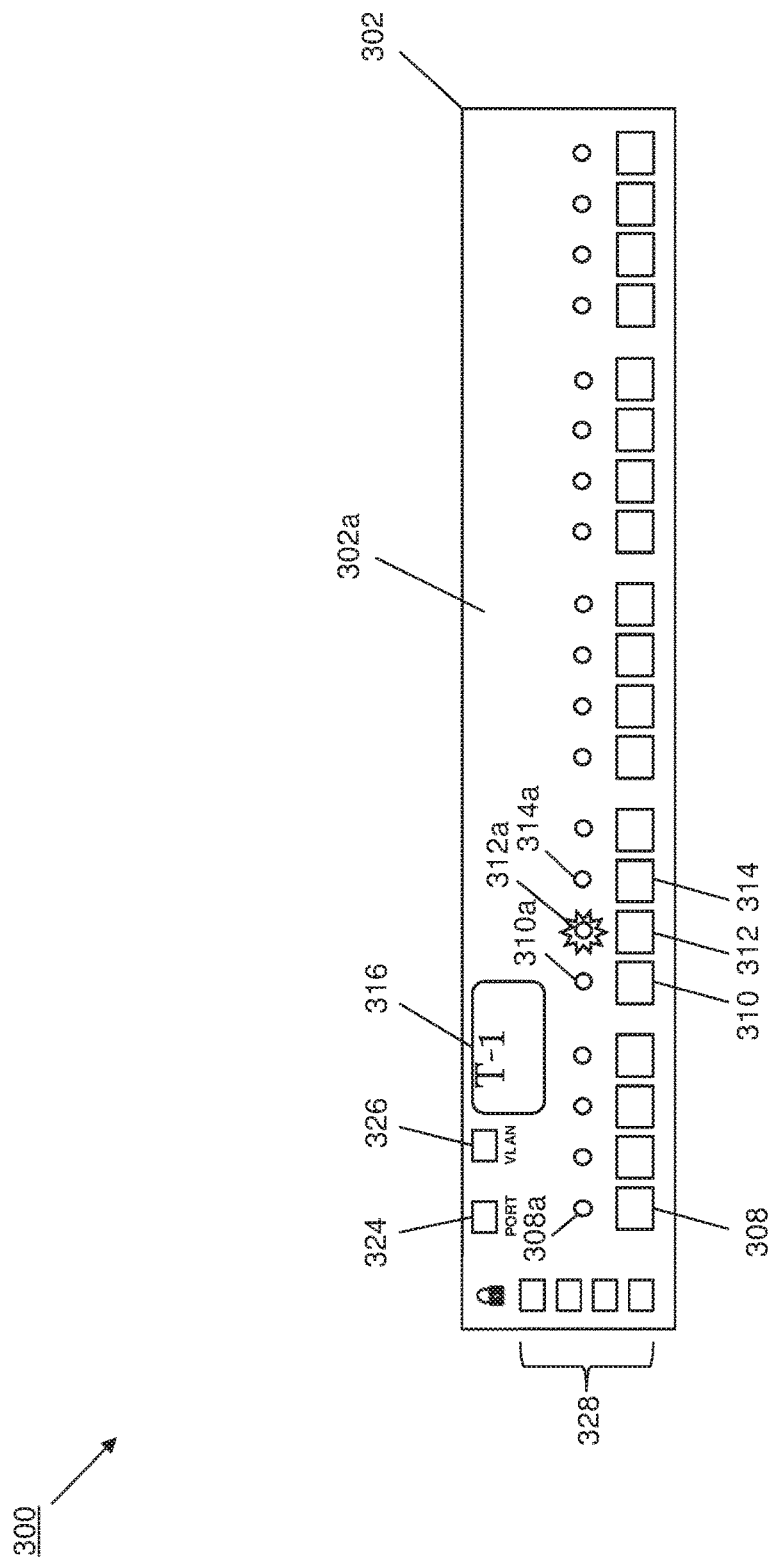
FIG. 7*d* is a front view illustrating an embodiment of the networking device of FIG. 3 during configuration according to the method of FIG. 6.

In another example, FIG. 7d illustrates the port configuration engine 204 having caused the port configuration display 316 to display a modified configuration "T-1" that indicates to the user that they have selected to provide a first trunking designation for the port 312 (e.g., selected from a plurality of different available trunking designations). The modified configuration displayed on the port configuration display 316 in FIG. 7d may result from an actuation of the "VLAN" selector port configuration button 326 that "holds down" the "VLAN" selector port configuration button 326 and causes the modified configuration displayed on the port configuration display 316 to quickly cycle through available modified configurations (e.g., to quickly advance from VLAN 001 (i.e., "001") through VLAN 999 (i.e., "999") and to the trunking designation(s) (i.e., "T-1")), and/or using a variety of other techniques that would be apparent to one of skill in the art in possession of the present disclosure.

Figure 7E:
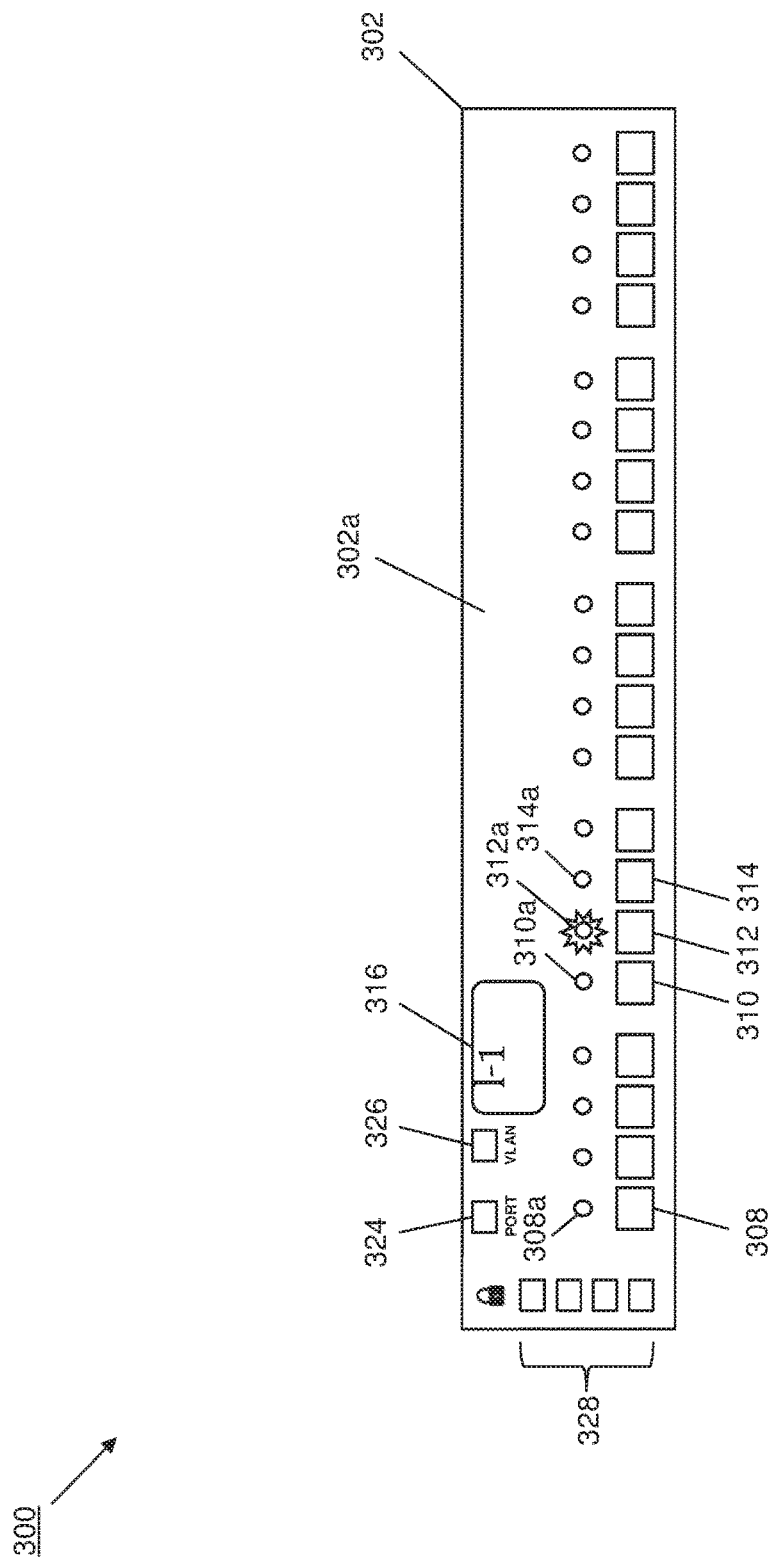
FIG. 7*e* is a front view illustrating an embodiment of the networking device of FIG. 3 during configuration according to the method of FIG. 6.

In yet another example, FIG. 7e illustrates the port configuration engine 204 having caused the port configuration display 316 to display a modified configuration "L-1" that indicates to the user that they have selected to provide a first LAG designation for the port 312 (e.g., selected from a plurality of different available LAG designations). The modified configuration displayed on the port configuration display 316 in FIG. 7e may result from an actuation of the "VLAN" selector port configuration button 326 that "holds down" the "VLAN" selector port configuration button 326 and causes the modified configuration displayed on the port configuration display 316 to quickly cycle through available modified configurations (e.g., to quickly advance from VLAN 001 (i.e., "001") through VLAN 999 (i.e., "999"), through the trunking designation(s) (i.e., "T-1" to "T-x"), and to the LAG designations (i.e., "L-1")), and/or using a variety of other techniques that would be apparent to one of skill in the art in possession of the present disclosure.

While only VLAN assignments, trunking designations, and LAG designations are discussed above as available configurations for the ports on the networking device 300, one of skill in the art in possession of the present disclosure will recognize that other configurations may be available while remaining within the scope of the present disclosure. Thus, using the techniques discussed above, any of the ports on the networking device 300 may be selected, and then have a modified configuration selected for application to that selected port as discussed below.

Referring now to FIGS. 8*a*, 8*b*, 8*c*, and 8*d*, at block 606 the port configuration engine 204 in the networking device 400 may detect that the port configuration buttons on the networking device 400 have been actuated a plurality of times and, in response, may cause a port configuration display associated with a selected port to indicate that that port has been selected based on the actuation of the port configuration buttons, and then cause that port configuration display to display a modified configuration based on the actuation of the port configuration buttons. For example, as discussed above and as illustrated in FIG. 8*b*, the port configuration display 416 associated with the port 408 may indicate that the port 408 has been selected (e.g., in response to an initial actuation of the "PORT" selector port configuration button 424 following the display of the current configurations of the ports as illustrated in FIG. 8*a*), and the port configuration engine 204 may then detect five actuations of the "PORT" selector port configuration button 424 and, in response, cause the port configuration display 420 that is associated with the port 412 to indicate that the port 412 has been selected, as illustrated in FIG. 8*c*. Then port configuration engine 204 may then detect actuation of the "VLAN" selector port configuration button 426 on the networking device 400 and operate to provide a modified configuration for display on the port configuration display 420.

Figure 8D:
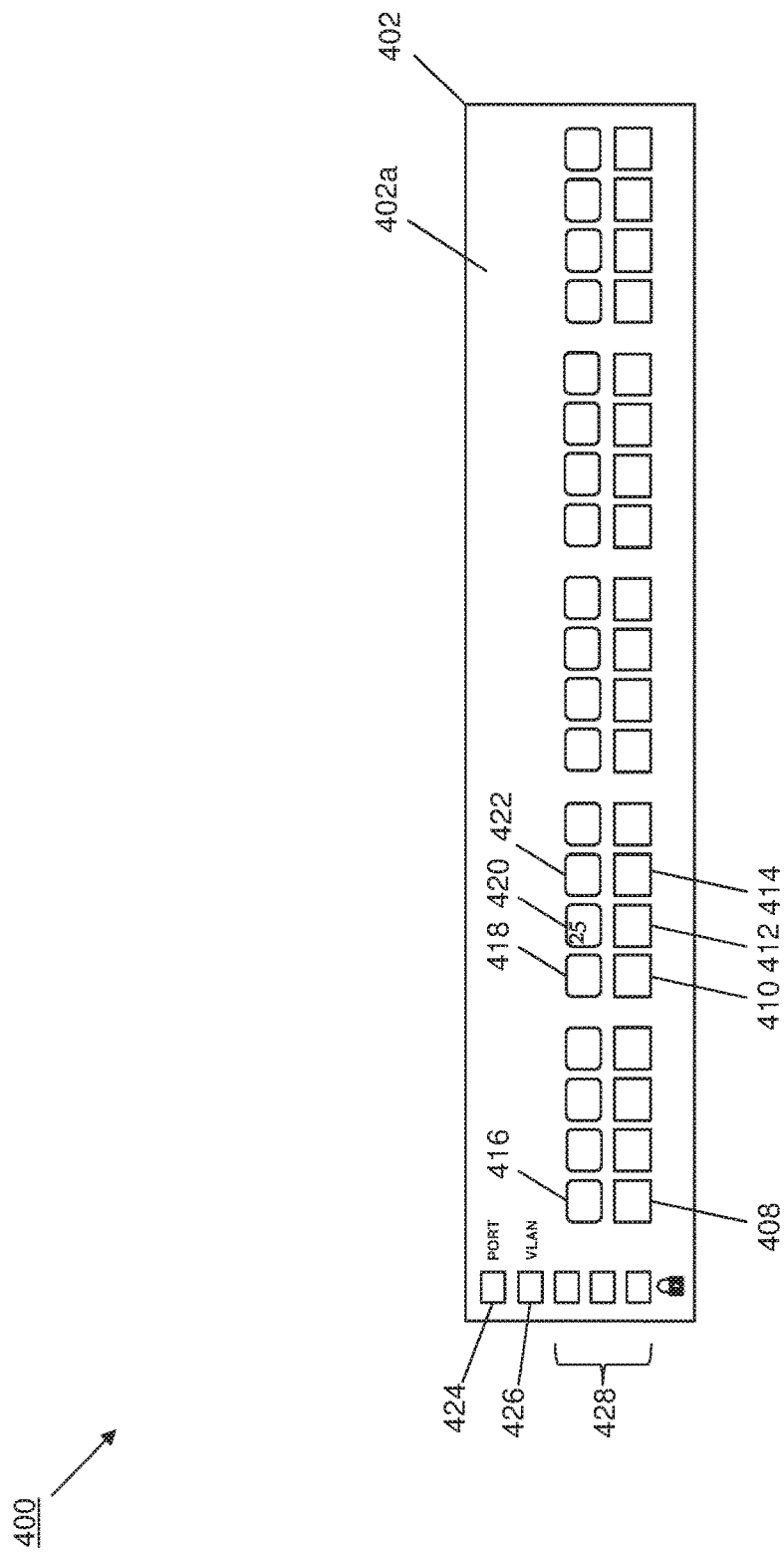
FIG. 8d is a front view illustrating an embodiment of the networking device of FIG. 4 during configuration according to the method of FIG. 6.

For example, FIG. 8*d* illustrates the port configuration engine 204 having caused the port configuration display 420 to display a modified configuration "25" that indicates to the user that they have selected to assign the port 412 to VLAN 25. The modified configuration displayed on the port configuration display 420 in FIG. 8*d* may result from 25 actuations of the "VLAN" selector port configuration button 426, an actuation of the "VLAN" selector port configuration button 426 that "holds down" the "VLAN" selector port configuration button 426 and causes the modified configuration displayed on the port configuration display 420 to quickly cycle through available modified configurations (e.g., to quickly advance from VLAN 01 (i.e., "01") to VLAN 25 (i.e., "25")), and/or using a variety of other techniques that would be apparent to one of skill in the art in possession of the present disclosure. While not explicitly illustrated for the networking device 400, one of skill in the art in possession of the present disclosure will recognize how the actuation of the "VLAN" selector port configuration button 426 may result in the display of a modified configuration "T1" that indicates to the user that they have selected to provide a first trunking designation for the port 412, or a modified configuration "L1" that indicates to the user that they have selected to provide a first LAG designation for the port 412, in substantially the same manner as discussed above for the networking device 300.

While only VLAN assignments, trunking designations, and LAG designations are discussed above as available configurations for the ports on the networking device 400, one of skill in the art in possession of the present disclosure will recognize that other configurations may be available while remaining within the scope of the present disclosure. Thus, using the techniques discussed above, any of the ports on the networking device 400 may be selected and have a modified configuration selected for application to that selected port as discussed below.

Referring now to FIGS. 9*a* and 9*b*, at block 606 the port configuration engine 204 in the networking device 500 may detect that a port configuration button on the networking device 500 that is associated with a respective port has been actuated a plurality of times and, in response, may cause the port configuration display associated with that selected port to display a modified configuration based on the actuation of the port configuration button. For example, as discussed above and as illustrated in FIG. 9*b*, the port configuration engine 204 may detect actuation of the "port-specific" port configuration button 528 associated with port 512 and operate to provide a modified configuration for display on the port configuration display 520.

For example, FIG. 9*b* illustrates the port configuration engine 204 having caused the port configuration display 520 to display a modified configuration "25" that indicates to the user that they have selected to assign the port 512 to VLAN 25. The modified configuration displayed on the port configuration display 520 in FIG. 9*b* may result from 25 actuations of the "port-specific" port configuration button 528, an actuation of the "port-specific" port configuration button 528 that "holds down" the "port-specific" port configuration button 528 and causes the modified configuration displayed on the port configuration display 520 to quickly cycle through available modified configurations (e.g., to quickly advance from VLAN 01 (i.e., "01") to VLAN 25 (i.e., "25")), and/or using a variety of other techniques that would be apparent to one of skill in the art in possession of the present disclosure. While not explicitly illustrated for the networking device 500, one of skill in the art in possession of the present disclosure will recognize how the actuation of the "port-specific" port configuration button 528 may result in the display of a modified configuration "T1" that indicates to the user that they have selected to provide a first trunking designation for the port 512, or a modified configuration "L1" that indicates to the user that they have selected to provide a first LAG designation for the port 512, in substantially the same manner as discussed above for the networking device 300.

While only VLAN assignments, trunking designations, and LAG designations are discussed above as available configurations for the ports on the networking device 500, one of skill in the art in possession of the present disclosure will recognize that other configurations may be available while remaining within the scope of the present disclosure. Thus, using the techniques discussed above, any of the ports on the networking device 500 may have a modified configuration selected for application to that selected port as discussed below The method 600 then proceeds to block 608 where the current configuration of a port is modified to provide a modified port configuration. In an embodiment, at block 608, the port configuration engine 204 operates to modify a current configuration of a port to provide a modified configuration. For example, following the display of a modified configuration for a selected port as discussed above in block 606, the port configuration engine 204 may determine that the modified configuration that was provided for display has been selected by the user in response to detecting no actuation of the port configuration button(s) for some time period (i.e., if a modified configuration for a port is displayed for some period of time, that modified configuration is determined to be selected by the user for that port.) However, in other embodiments, port configuration button(s) may be provided that, when actuated, provide an explicit selection and/or verification of a modified configuration for a port that is being displayed. Furthermore, any technique for determining that a displayed modified configuration for a port has been selected by a user is envisioned as falling within the scope of the present disclosure.

In an embodiment, in response to determining that a modified configuration for a port has been selected by a user, the port configuration engine may operate to modify the current configuration of that port to provide the modified configuration for that port by disassociating that port from a first predefined port configuration (i.e., the current configuration) stored in the port configuration database 206, and associating that port with a second predefined port configuration (e.g., the modified configuration) stored in the port configuration database 206. For example, the port configuration engine 204 may remove an identifier for the selected port from an entry in the port configuration table (discussed above) that associates the selected port with a first configuration (e.g., the current configuration that assigns the selected port to a particular VLAN), and add an identifier for the selected port to an entry in the port configuration table that associates the selected port with a second configuration (e.g., the modified configuration that assigns the selected port to a different VLAN, and/or provides a trunking designation or LAG designation for the selected port).

In another embodiment, in response to determining that a modified configuration for a port has been selected by a user, the port configuration engine may operate to modify the current configuration of that port to provide the modified configuration for that port by creating the selected modified configuration (e.g., creating a selected VLAN) and storing it in the port configuration database 206, and then and applying that modified configuration to that port by associating them in the port configuration database. For example, the port configuration engine 204 may create a selected VLAN, a trunking designation, or a LAG designation; store the created VLAN, trunking designation, or LAG designation in the port configuration database 206; and then apply the created VLAN, trunking designation, or LAG designation to the selected port. Thus, modified configurations selected for a port may be created "on-the-fly" and applied to that port based on the actuation of the port configuration button(s).

The method 600 then proceeds to optional block 610 where it is determined that a combination of port configuration button(s) have been actuated to provide the security code, and the modified configuration of the one or more port(s) is locked. As discussed above, the port configuration engine 204 may be configured to "lock" configurations of the ports on the networking device 200 such that they may not be modified without the receipt of a security code to "unlock' those configurations. However, in other embodiments, optional block 610 may be omitted (i.e., when unauthorized modification of configurations provided by the networking device 200 is not a concern.) As discussed above, one or more buttons may be provided on the networking device 200 for providing the security code. In an embodiment of optional block 610, the port configuration engine 204 may detect a user actuating a combination of the plurality of port configuration buttons 224-230, determine that that combination corresponds to a security code (e.g., stored in the port configuration database 206) and, in response, lock the modified configuration of the ports on the networking device 200 such that that modified configuration may not be modified again without a subsequent receipt of the security code. For example, at optional block 604 and in response to receiving the security code, the port configuration engine 204 may lock access to the port configuration table in the port configuration database 206 such that modification of entries in the port configuration table is not allowed.

Referring now to FIGS. 7c, 7d, and 7e, in an embodiment of optional block 610, the user may actuate a combination of the plurality of "security code" provisioning port configuration buttons 328 on the networking device 300 that corresponds to the security code discussed above, and the port configuration engine 204 may then lock the modified configurations provided for the port(s) on the networking device 300. In some examples, the provisioning of the security code at optional block 604 may lock the modified configuration and any current/unmodified configurations for all of the ports on the networking device 300. However, in other examples, the provisioning of the security code at optional block 610 may only lock the modified configuration provided for the "selected" port (e.g., port 312 in FIGS. 7c, 7d, and 7e) on the networking device 300 (i.e., the security code may be provided on a port-by-port basis.)

Referring now to FIG. 8d, in an embodiment of optional block 610, the user may actuate a combination of the plurality of "security code" provisioning port configuration buttons 428 on the networking device 400 that corresponds to the security code discussed above, and the port configuration engine 204 may then lock the modified configurations provided for the port(s) on the networking device 400. In some examples, the provisioning of the security code at optional block 604 may lock the modified configuration and any current/unmodified configurations for all of the ports on the networking device 400. However, in other examples, the provisioning of the security code at optional block 604 may only lock the modified configuration provided for a "selected" port (e.g., port 412 in FIG. 8d) on the networking device 400 (i.e., the security code may be required on a port-by-port basis).

Referring now to FIG. 9b, in an embodiment of optional block 604, the user may actuate a combination of the plurality of the port configuration buttons on the networking device 500 that corresponds to the security code discussed above, and the port configuration engine 204 may then lock the modified configurations provided for the port(s) on the networking device 500. For example, the user may actuate the "security code" port configuration button 522 to indicate to the port configuration engine 204 that a security code is about to be provided, and then actuate a combination of the port configuration buttons on the networking device 500 (e.g., the port configuration button 524, the port configuration button 528, and/or any of the other port configuration buttons on the networking device 500) to provide the security code. In some examples, the provisioning of the security code at optional block 604 may lock the modified configuration and any current/unmodified configurations for all of the ports on the networking device 500. However, in other examples, the provisioning of the security code at optional block 604 may only lock the modified configuration of a "selected" port (e.g., port 512 in FIG. 9b) on the networking device 500 (i.e., the security code may be required on a port-by-port basis).

The method 600 then proceeds to block 612 where the modified configuration of the one or more ports is displayed on the one or more port configuration displays. In an embodiment, at block 612, the port configuration engine 204 may operate to provide the modified configurations for one or more ports for display on the port configuration display(s) 216, 218, 220, and/or 222. In addition, at block 612, the port configuration engine 204 may operate to provide any current/unmodified configurations for the ports for display on the port configuration display(s) along with any of the modified configurations that were provided to the port(s) according to the method 600. Furthermore, one of skill in the art in possession of the present disclosure will recognize that following the provisioning of a modified configuration to a port, that modified configuration may be considered a "current configuration" that may then be subsequently modified in the same manner as discussed above. As such, at block 602 the port configuration engine 204 may access the port configuration database 206, retrieve the configurations for the port(s), and provides those configurations for display on the port configuration display(s).

For example, with reference to the networking device 300 illustrated in FIGS. 7c-7e, at block 612 the user may actuate the "PORT" selector port configuration button 324 on the networking device 300 in order to select any of the ports on the networking device 300 and view the configuration of that port. For example, four actuations of the "PORT" selector port configuration button 324 may cause the port configuration engine 204 to cause the port configuration display 316 to display the configuration of the port 310, five actuations of the "PORT" selector port configuration button 324 may cause the port configuration engine 204 to cause the port configuration display 316 to display the configuration of the port 312 (as illustrated by the VLAN "025" assignment in FIG. 7c, the first trunking designation "T-1" illustrated in FIG. 7d, and the first LAG designation "L-1" illustrated in FIG. 7e), and six actuations of the "PORT" selector port configuration button 324 may cause the port configuration engine 204 to cause the port configuration display 316 to display the configuration of the port 314. As such, one of skill in the art in possession of the present disclosure will recognize how the "PORT" selector port configuration button 324 may be actuated by the user to select any of the ports on the networking device 300 for configuration viewing.

Figure 8E:
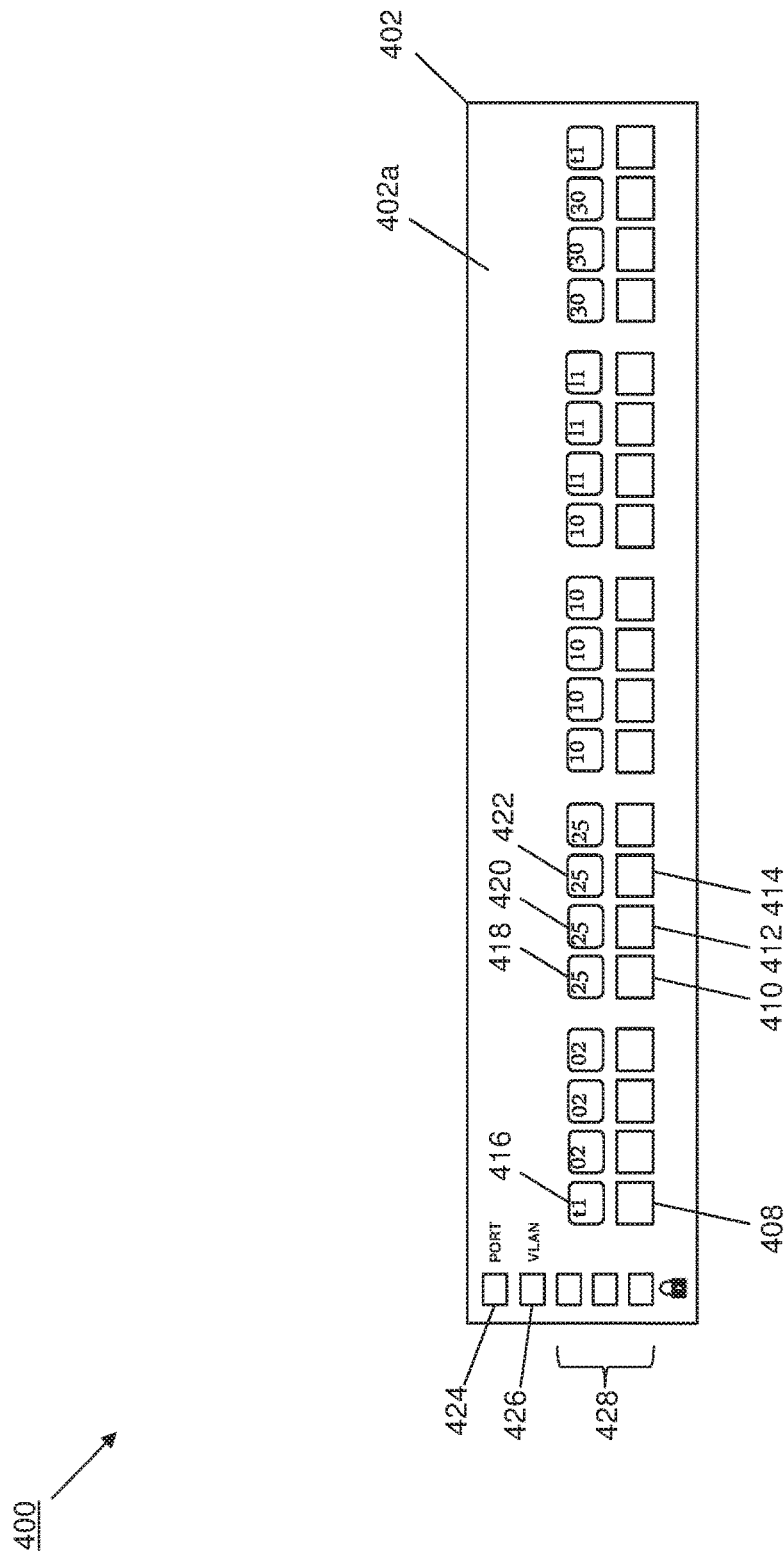
FIG. 8e is a front view illustrating an embodiment of the networking device of FIG. 4 during configuration according to the method of FIG. 6.

In another example, with reference to FIG. 8e, at block 612 the port configuration engine 204 accesses the port configuration database 206 and operates to retrieve the configuration of each of the ports on the networking device 400, and provides those configurations on the respective port configuration displays that are associated with those ports. In the illustrated embodiment, the configuration of the port 408 is displayed as "T1" on the port configuration display 416 to indicate that port 408 is has been designated as a trunking port, the configurations of the ports 410, 412, and 414 are displayed as "25" on their respective port configuration displays 418, 420, and 422 to indicate that the ports 410, 412, and 414 have been assigned to VLAN 25, while other groups of ports on the networking device 400 have been assigned to VLAN 02 (indicated by the display of "02" on their respective port configuration displays), VLAN 10 (indicated by the display of "10" on their respective port configuration displays), VLAN 30 (indicated by the display of "30" on their respective port configuration displays), as well as designated as part of a LAG (indicated by the display of "L1" on their respective port configuration displays) or as another trunking port (indicated by the display of "T1" on their respective port configuration displays).

Figure 9C:
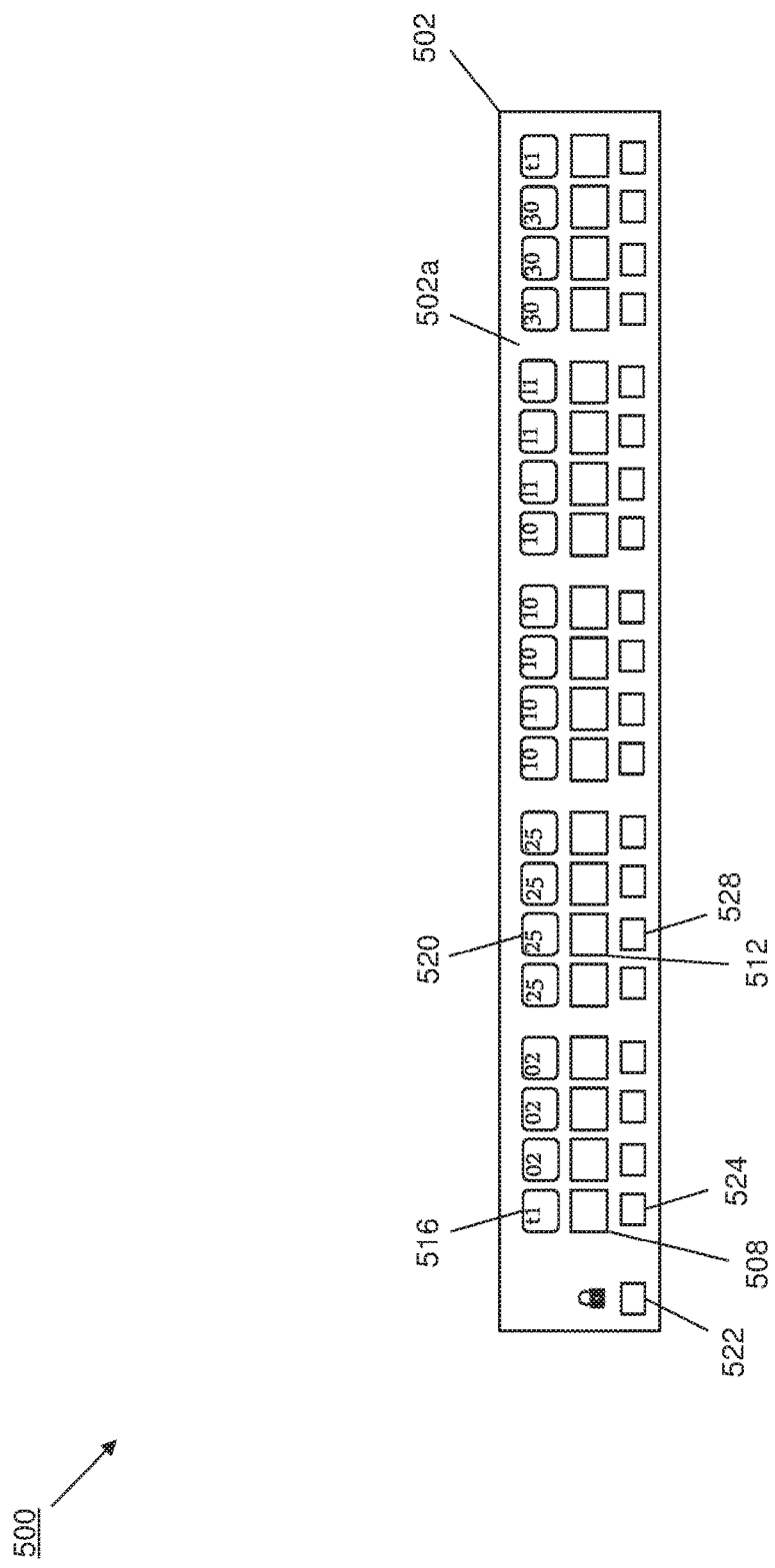
FIG. 9c is a front view illustrating an embodiment of the networking device of FIG. 5 during configuration according to the method of FIG. 6.

In another example, with reference to FIG. 9c, at block 612 the port configuration engine 204 accesses the port configuration database 206 and operates to retrieve the configuration of each of the ports on the networking device 500, and provides those configurations on the respective port configuration displays that are associated with those ports. In the illustrated embodiment, the configuration of the port 508 is displayed as "T1" on the port configuration display 516 to indicate that port 508 is has been designated as a trunking port, the configurations of the port 512 is displayed as "25" on the port configuration display 520 to indicate that the port 512 has been assigned to VLAN 25, while other groups of ports on the networking device 400 have been assigned to VLAN 25 (indicated by the display of "25" on their respective port configuration displays), VLAN 02 (indicated by the display of "02" on their respective port configuration displays), VLAN 10 (indicated by the display of "10" on their respective port configuration displays), VLAN 30 (indicated by the display of "30" on their respective port configuration displays), as well as designated as part of a LAG (indicated by the display of "L1" on their respective port configuration displays) or as another trunking port (indicated by the display of "T1" on their respective port configuration displays).

While the ports on the networking devices in the embodiments discussed above have been described as having a single configuration displayed, one of skill in the art in possession of the present disclosure will recognize that ports on the networking devices may have multiple configurations, and the display of those multiple configurations will fall within the scope of the present disclosure as well. For example, a group of ports on the networking devices discussed above may be assigned to a particular VLAN (e.g., VLAN 25 displayed as "25" on their respective port configuration displays) using the techniques discussed above, and then may be designed as part of LAG (e.g., a first LAG designation displayed as "L-1" on their respective port configuration devices) by immediately following the assignment of those ports to VLAN 25 with a selection of the first LAG designation (e.g., actuation of the port configuration buttons for those ports such that the first LAG designation is displayed, followed by no actuation of those port configuration buttons for some period of time as discussed above). In such a multi-configuration embodiment, block 612 of the method 600 may include the port configuration engine 204 causing the port configuration displays for those ports to cycle between the display of "25" and "L-1" to indicate to a user that those ports are assigned to VLAN 25 and are part of the first LAG.

Thus, system and methods have been described that provide a networking device having port configuration button(s) and port configuration display(s) that are accessible and visible on a surface of the networking device and that operate with a port configuration engine and a port configuration database to provide intuitive management/configuration of the networking device without the need for conventional managed networking device elements such as a management networks, console cabling, console ports, web user interfaces, command line coding, management devices (e.g., a laptop computer), technical networking expertise, and/or technical support. The port configuration display(s) operate to display the configuration of the ports to allow a user to quickly and easily ascertain the configuration of each port, as well as make changes to those configurations if desired.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Information Handing System (IHS), comprising:
a chassis;
a port that is located on a first surface the chassis;
a port configuration display that is located on the first surface of the chassis;
at least one port configuration button that is located on the chassis; and
a port configuration engine that is included in the chassis and that is coupled to each of the port, the port configuration display, and the at least one port configuration button, wherein the port configuration engine is configured to:
provide, for display on the port configuration display, a current configuration of the port;
determine that the at least one port configuration button has been actuated at least once;
modify, in response to determining that the at least one port configuration button has been actuated at least once, the current configuration of the port to provide a modified configuration of the port; and
provide, for display on the port configuration display, the modified configuration of the port.

2. The IHS of claim 1, wherein the at least one port configuration button includes a plurality of port configuration buttons, and wherein the port configuration engine is configured to:
determine, subsequent to modifying the current configuration of the port to provide the modified configuration of the port, that a combination of the plurality of port configuration buttons have been actuated; and
determine that the combination of the plurality of port configuration buttons that were actuated correspond to a security code and, in response, lock the modified configuration of the port such that the modified configuration of the port cannot be changed without a subsequent receipt of the security code.

3. The IHS of claim 1, further comprising:
a port indicator that is located on the chassis immediately adjacent the port and that is coupled to the port configuration engine, wherein the port configuration engine is configured to:
activate, in response to determining that a first port configuration button of the at least one port configuration button has been actuated a first time, the port indicator,
wherein the current configuration of the port is modified to provide a modified configuration of the port in response to determining that a second port configuration button of the at least one port configuration button has been actuated at least once.

4. The IHS of claim 3, wherein the port is a first port that is located immediately adjacent a second port that is located on the chassis, the port indicator is a first port indicator, and the port configuration engine is configured to:
deactivate, in response to determining that the first port configuration button has been actuated a second time that is subsequent to the first time, the first port indicator; and
activate, in response to determining that the first port configuration button was actuated the second time, a second port indicator that is located on the chassis immediately adjacent a second port.

5. The IHS of claim 1, wherein the port configuration display is located on the chassis immediately adjacent the port.

6. The IHS of claim 1, wherein the at least one port configuration button includes a first port configuration button that is located on the chassis immediately adjacent the port.

7. The IHS of claim 1, further comprising:
a port configuration database that is included in the chassis and that stores a plurality of predefined port configurations, wherein the port configuration engine is configured to modify the current configuration of the port to provide the modified configuration of the port by:
disassociating the port from a first predefined port configuration stored in the port configuration database; and
associating the port with a second predefined port configuration stored in the port configuration database.

8. A networking device, comprising:
a chassis;
a port that is located on a first surface the chassis;
a port configuration display that is located on the first surface of the chassis;
a plurality of port configuration buttons that are located on the chassis; and
a port configuration engine that is included in the chassis and that is coupled to each of the port, the port configuration display, and the plurality of port configuration buttons, wherein the port configuration engine is configured to:
provide, for display on the port configuration display, a current Virtual Local Area Network (VLAN) assignment for the port;
determine that a first port configuration button of the plurality of port configuration buttons has been actuated at least once;
modify, in response to determining that the first port configuration button has been actuated at least once, the current VLAN assignment for the port to provide a modified VLAN assignment for the port; and
provide, for display on the port configuration display, the modified VLAN assignment for the port.

9. The networking device of claim 8, wherein the port configuration engine is configured to:
determine that a combination of the plurality of port configuration buttons have been actuated prior to determining that the first port configuration button has been actuated at least once; and
determine that the combination of the plurality of port configuration buttons that were actuated correspond to a security code and, in response, unlock the current VLAN assignment for the port such that the current VLAN assignment for the port can be modified.

10. The networking device of claim 8, further comprising:
a port indicator that is located on the chassis immediately adjacent the port and that is coupled to the port configuration engine, wherein the port configuration engine is configured to:
activate, in response to determining that a second port configuration button of the plurality of port configuration buttons has been actuated at least once prior to determining that the first port configuration button has been actuated at least once, the port indicator.

11. The networking device of claim 8, where in the port configuration engine is configured to:

determine that the first port configuration button has been actuated at least once subsequent to modifying the current VLAN assignment for the port to provide the modified VLAN assignment for the port and, in response, modify the modified VLAN assignment for the port to provide a trunking designation for the port; and provide, for display on the port configuration display, the trunking designation for the port.

12. The networking device of claim 8, where in the port configuration engine is configured to:

determine that the first port configuration button has been actuated at least once subsequent to modifying the current VLAN assignment for the port to provide the modified VLAN assignment for the port and, in response, modify the modified VLAN assignment for the port to provide a Link Aggregation Group (LAG) designation for the port; and provide, for display on the port configuration display, the LAG designation for the port.

13. The networking device of claim 8, wherein the first port configuration button is located on the chassis immediately adjacent the port.

14. The networking device of claim 8, further comprising:

a port configuration database that is included in the chassis and that stores a plurality of predefined port VLAN assignments, wherein the port configuration engine is configured to modify the current VLAN assignment for the port to provide the modified VLAN assignment for the port by:

disassociating the port from a first predefined port VLAN assignment stored in the port configuration database; and associating the port with a second predefined port VLAN assignment stored in the port configuration database.

15. A method for configuring a networking device, comprising:

providing, by a port configuration engine for display on a port configuration display that is located on a first surface of a chassis, a current configuration of a port that is located on the first surface of the chassis;

determining, by the port configuration engine, that at least one port configuration button that is located on the chassis has been actuated at least once;

modifying, by the port configuration engine in response to determining that the at least one port configuration button has been actuated at least once, the current configuration of the port to provide a modified configuration of the port; and providing, by the port configuration engine for display on the port configuration display, the modified configuration of the port.

16. The method of claim 15, wherein the at least one port configuration button includes a plurality of port configuration buttons, and wherein the method further comprises:

determining, by the port configuration engine subsequent to modifying the current configuration of the port to provide the modified configuration of the port, that a combination of the plurality of port configuration buttons have been actuated; and determining, by the port configuration engine, that the combination of the plurality of port configuration buttons that were actuated correspond to a security code and, in response, locking the modified configuration of the port such that the modified configuration of the port cannot be changed without a subsequent receipt of the security code.

17. The method of claim 15, further comprising:

activating, by the port configuration engine in response to determining that a first port configuration button of the at least one port configuration button has been actuated a first time, a port indicator that is located on the chassis immediately adjacent the port, wherein the current configuration of the port is modified to provide a modified configuration of the port in response to determining that a second port configuration button of the at least one port configuration button has been actuated at least once.

18. The method of claim 15, wherein the port configuration display is located on the chassis immediately adjacent the port.

19. The method of claim 15, wherein the at least one port configuration button includes a first port configuration button that is located on the chassis immediately adjacent the port.

20. The method of claim 15, wherein the port configuration engine is configured to modify the current configuration of the port to provide the modified configuration of the port by:

disassociating, by the port configuration engine, the port from a first predefined port configuration that is stored in a port configuration database that is included in the chassis; and associating, by the port configuration engine, the port with a second predefined port configuration that is stored in the port configuration database.

* * * * *